United States Patent
Suga et al.

(10) Patent No.: US 8,537,290 B2
(45) Date of Patent: Sep. 17, 2013

(54) PROJECTOR APPARATUS

(75) Inventors: Akinobu Suga, Tokyo (JP); Takayuki Uchiyama, Yokohama (JP)

(73) Assignee: Nikon Corporation, Tokyo (JP)

(*) Notice: Subject to any disclaimer, the term of this patent is extended or adjusted under 35 U.S.C. 154(b) by 183 days.

(21) Appl. No.: 12/673,151

(22) PCT Filed: Oct. 6, 2008

(86) PCT No.: PCT/JP2008/068165
§ 371 (c)(1),
(2), (4) Date: Feb. 11, 2010

(87) PCT Pub. No.: WO2009/051029
PCT Pub. Date: Apr. 23, 2009

(65) Prior Publication Data
US 2012/0133851 A1    May 31, 2012

(30) Foreign Application Priority Data

Oct. 18, 2007 (JP) ................................. 2007-271218
Oct. 22, 2007 (JP) ................................. 2007-273867

(51) Int. Cl.
*G02F 1/1335*        (2006.01)
*G03B 21/14*         (2006.01)

(52) U.S. Cl.
USPC ...................... 349/9; 349/5; 349/8; 353/20

(58) Field of Classification Search
USPC ............................................................ 353/20
See application file for complete search history.

(56) References Cited

U.S. PATENT DOCUMENTS

| | | | |
|---|---|---|---|
| 5,327,270 A * | 7/1994 | Miyatake | 349/9 |
| 5,786,873 A | 7/1998 | Chiu et al. | |
| 2002/0140913 A1 | 10/2002 | Yoneyama et al. | |
| 2004/0184006 A1 | 9/2004 | Okuyama et al. | |
| 2005/0190342 A1 | 9/2005 | Suzuki et al. | |
| 2012/0133851 A1* | 5/2012 | Suga et al. | 349/9 |

FOREIGN PATENT DOCUMENTS

| EP | 0 389 240 B1 | 8/1995 |
|---|---|---|
| EP | 1 443 356 A2 | 8/2004 |
| JP | A-02-250026 | 10/1990 |

(Continued)

OTHER PUBLICATIONS

International Search Report issued on Jan. 13, 2009 in International Application No. PCT/JP2008/068165 (with translation).

(Continued)

*Primary Examiner* — Rhonda Peace
(74) *Attorney, Agent, or Firm* — Miles & Stockbridge P.C.

(57) ABSTRACT

A projector apparatus includes: a polarization beam splitter block assuming a shape of a rectangular parallelepiped that includes two end surfaces and four side surfaces; a light source opposed to one of the side surfaces; an illumination optical system disposed between the light source and the polarization beam splitter block, which converts illuminating light to substantially parallel light so that is directed to the polarization beam splitter block; a reflection-type liquid crystal display element opposed to an illuminating light output surface, through which an illuminating light undergone polarization separation is output, and that includes a rectangular display area through which the illuminating light is modulated to modulated light output to the polarization beam splitter block; and a projection optical system that forms a projection image with the modulated light undergone polarization separation, wherein: shorter borders of the rectangular display area is set parallel to the end surfaces.

13 Claims, 24 Drawing Sheets

(56) References Cited

FOREIGN PATENT DOCUMENTS

| | | |
|---|---|---|
| JP | A-03-249616 | 11/1991 |
| JP | A-10-123975 | 5/1998 |
| JP | A-11-125814 | 5/1999 |
| JP | A-2000-206463 | 7/2000 |
| JP | A-2001-083604 | 3/2001 |
| JP | A-2002-122811 | 4/2002 |
| JP | A-2002-287084 | 10/2002 |
| JP | B2-3490886 | 1/2004 |
| JP | A-2004-233910 | 8/2004 |
| JP | A-2005-031108 | 2/2005 |
| JP | A-2005-215527 | 8/2005 |
| JP | A-2005-250392 | 9/2005 |
| JP | B2-3849400 | 11/2006 |
| WO | WO 2007/114357 A1 | 10/2007 |

OTHER PUBLICATIONS

Extended European Search Report (with search opinion) from EP Appln. No. 08839976.1.

European Office Action in Application No. 08 839 976.1 dated Oct. 12, 2012.

Office Action issued on May 3, 2013, in European Patent Application No. 08839976.1.

* cited by examiner

FIG.1
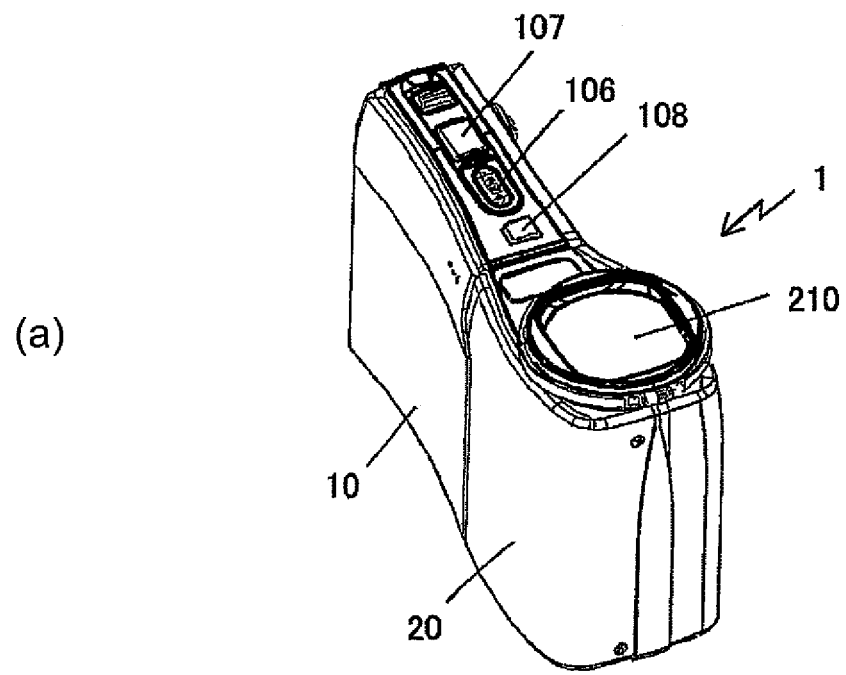
(a)
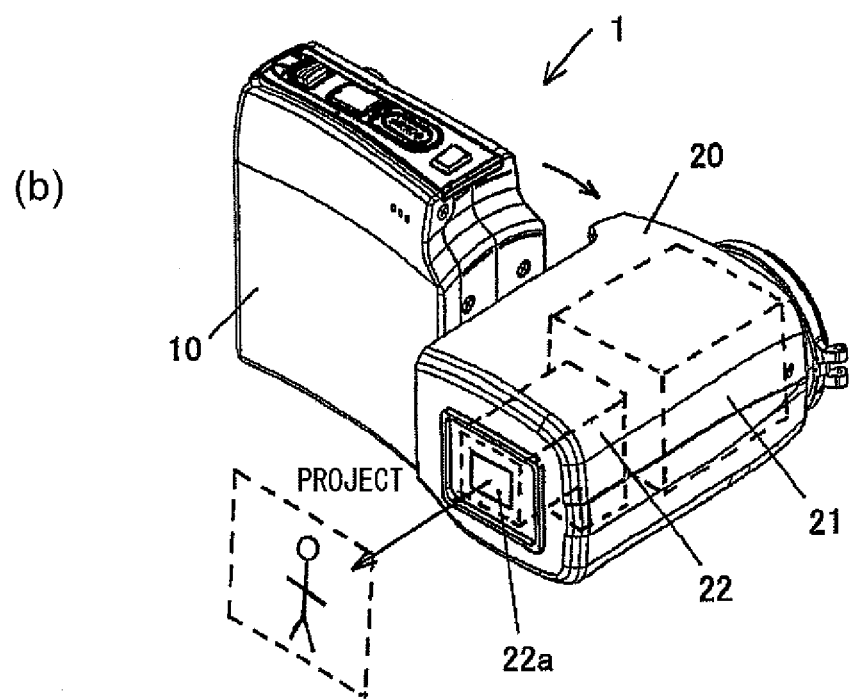
(b)

FIG.3
(a)
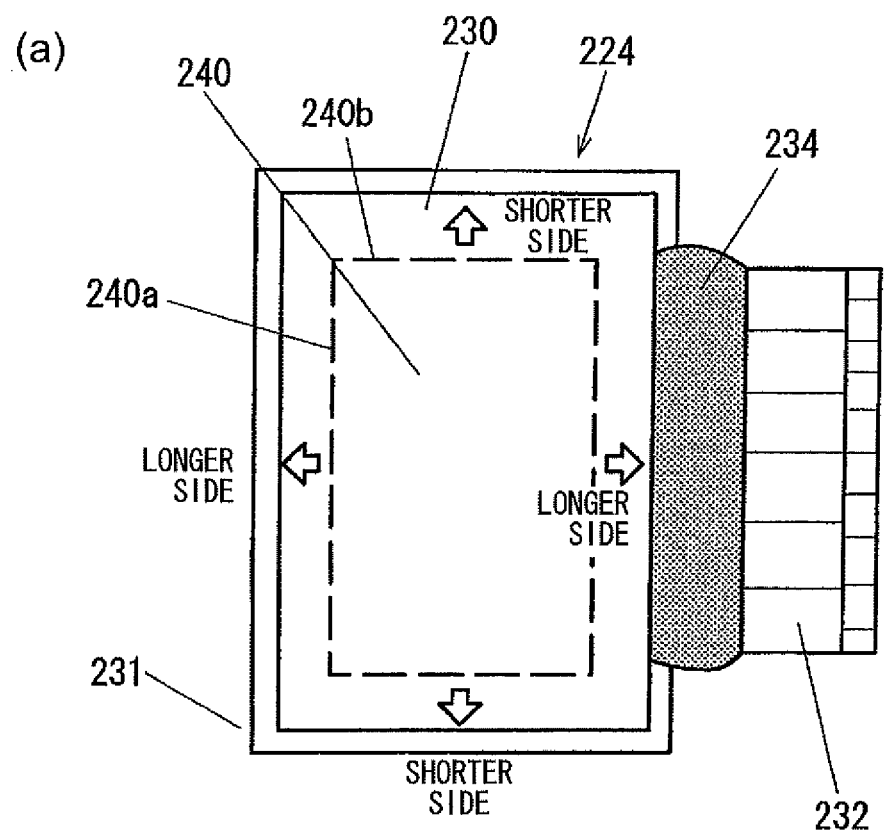
(b)
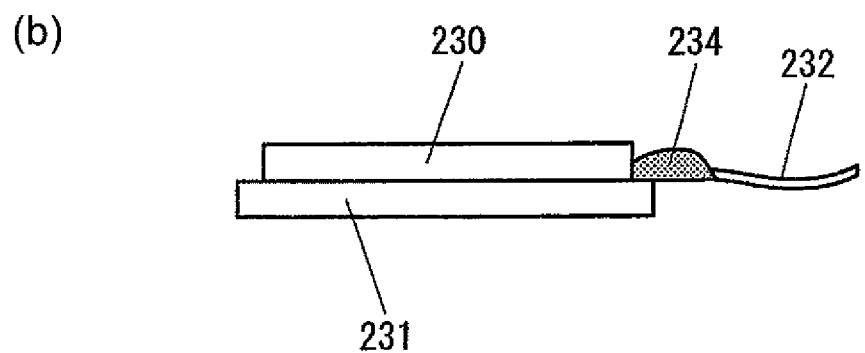

FIG.7
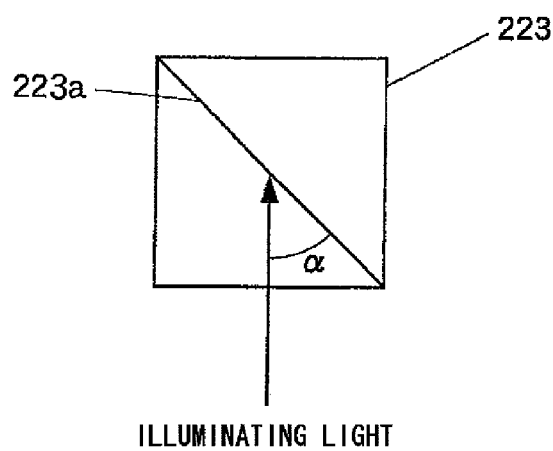
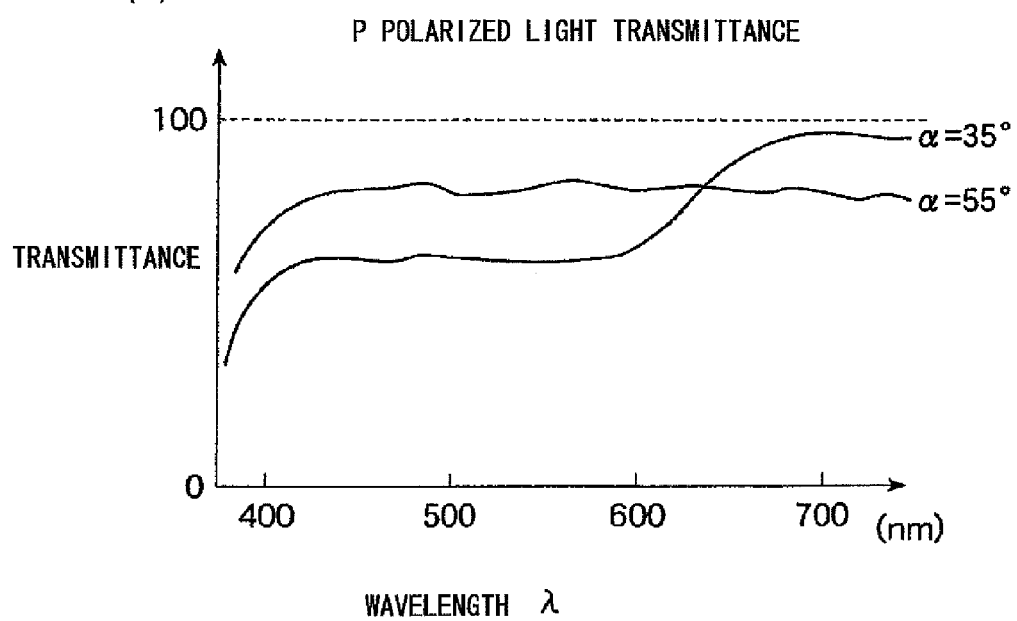

FIG.13
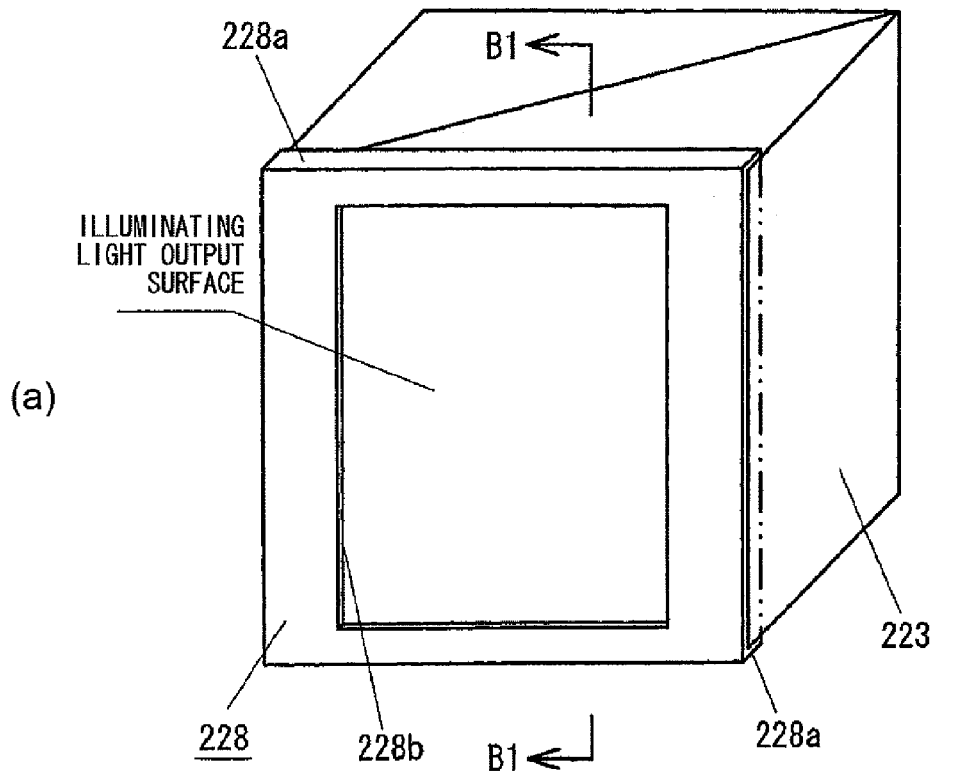
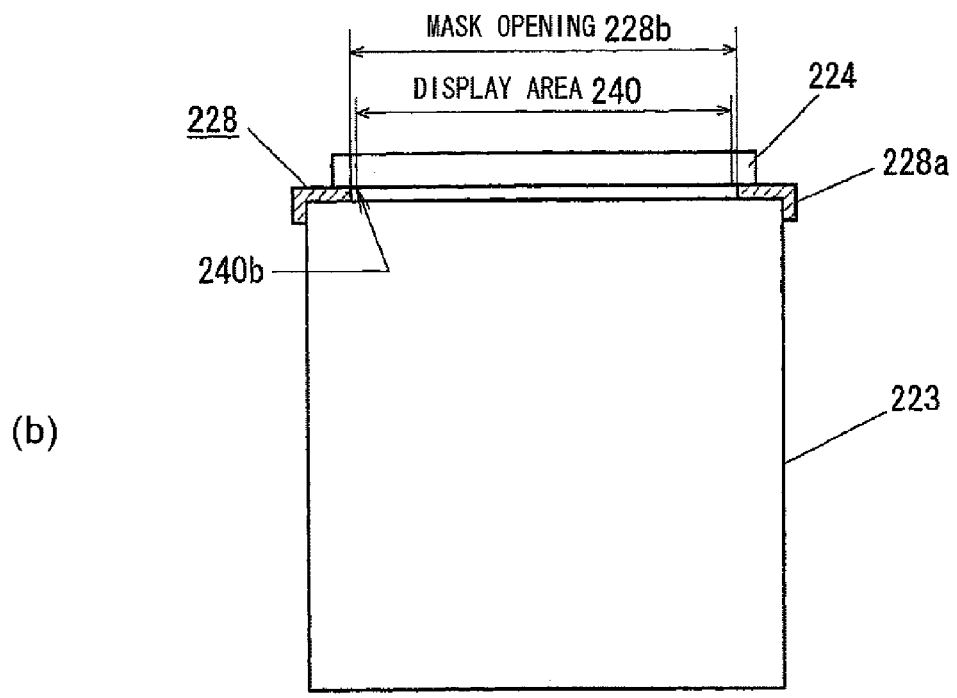

FIG.14
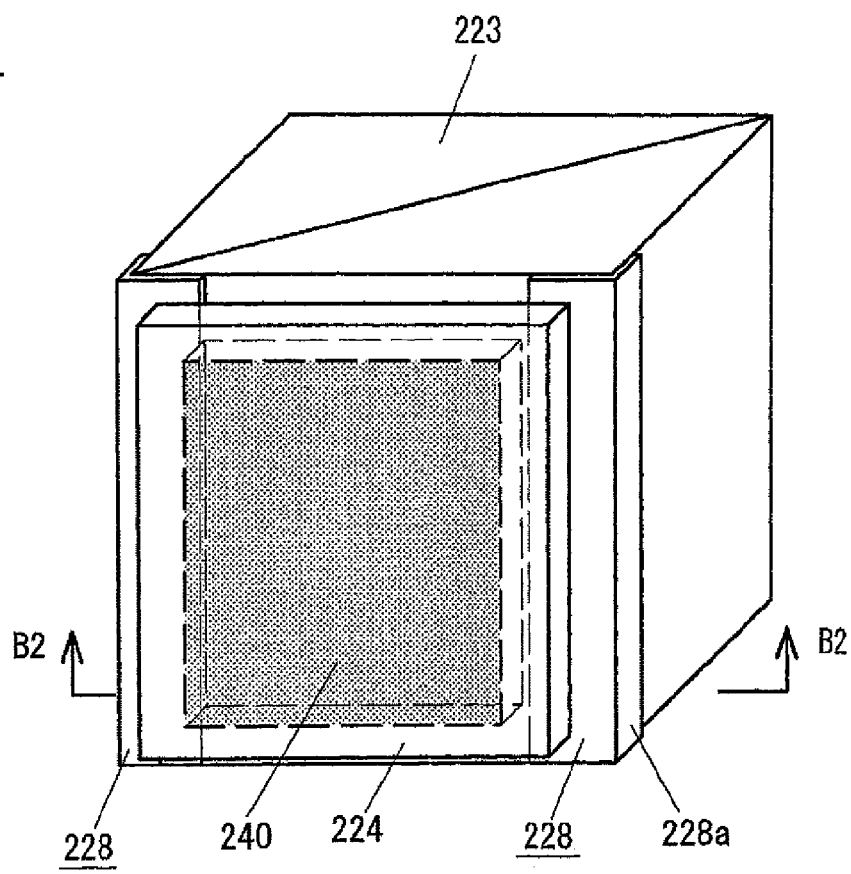
(a)
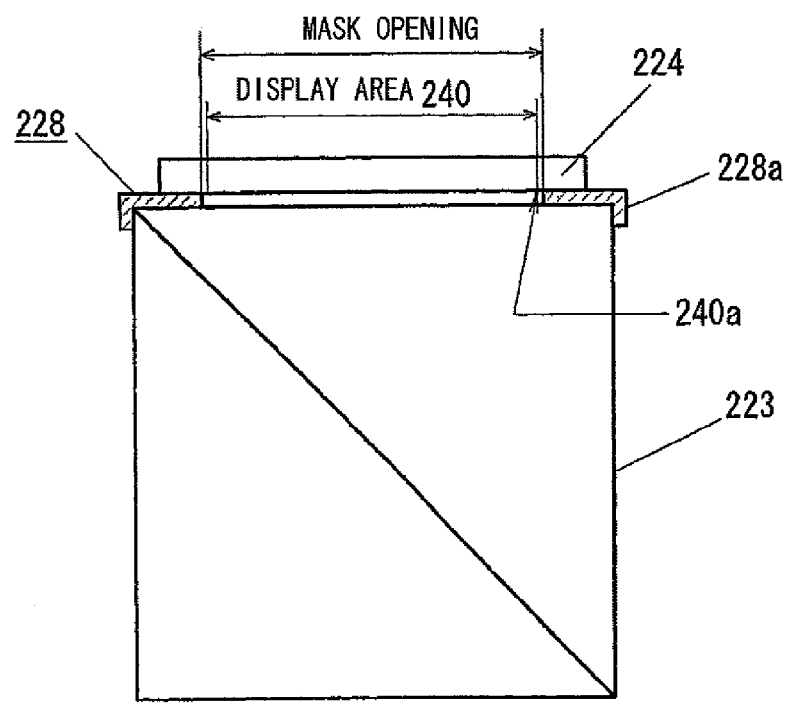
(b)

FIG.15
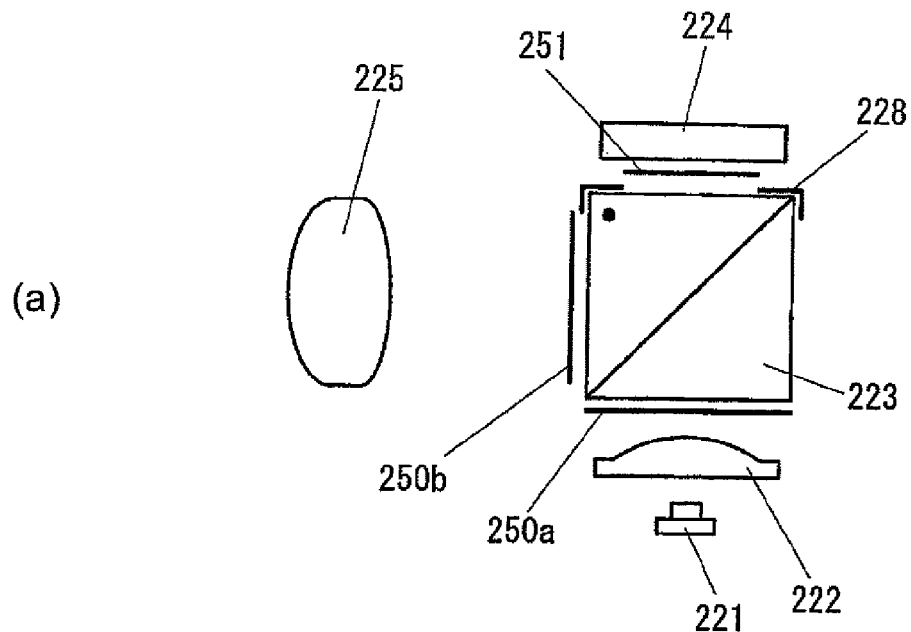
(a)
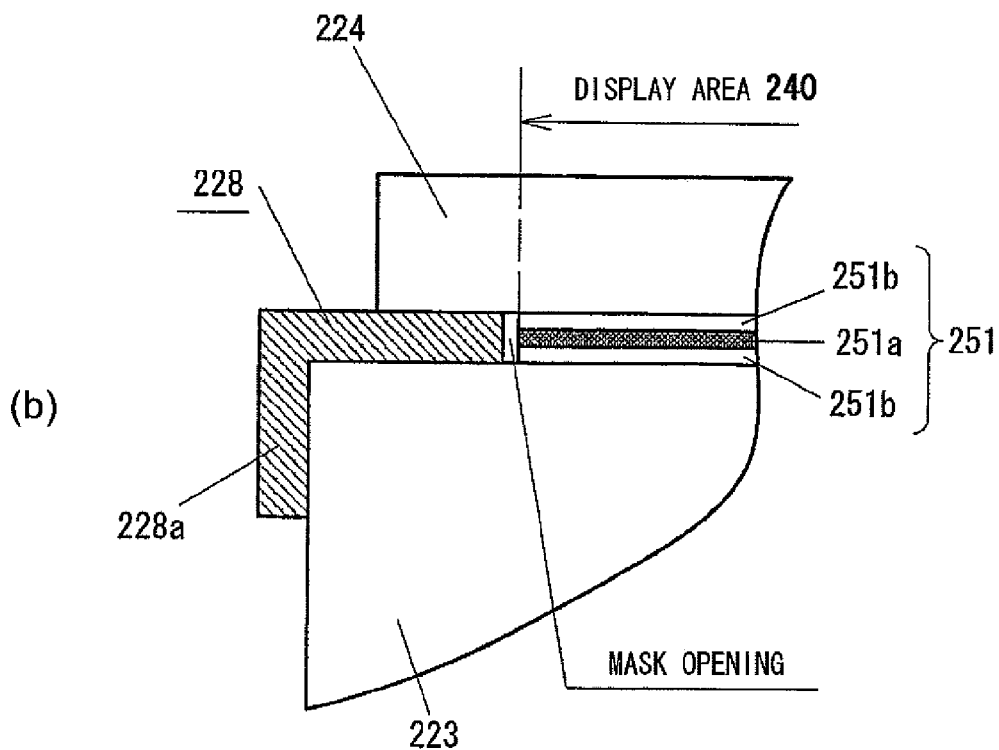
(b)

FIG.17
(a) 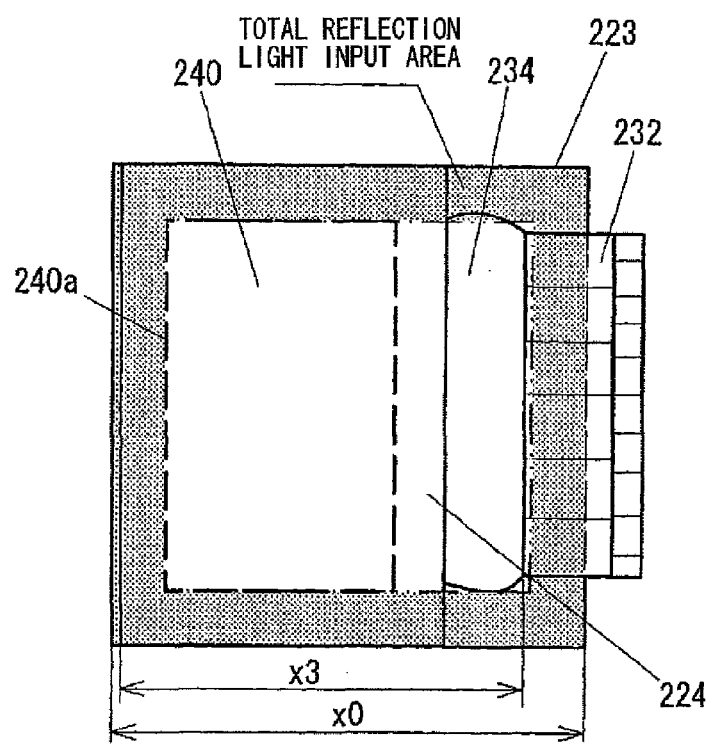
(b) 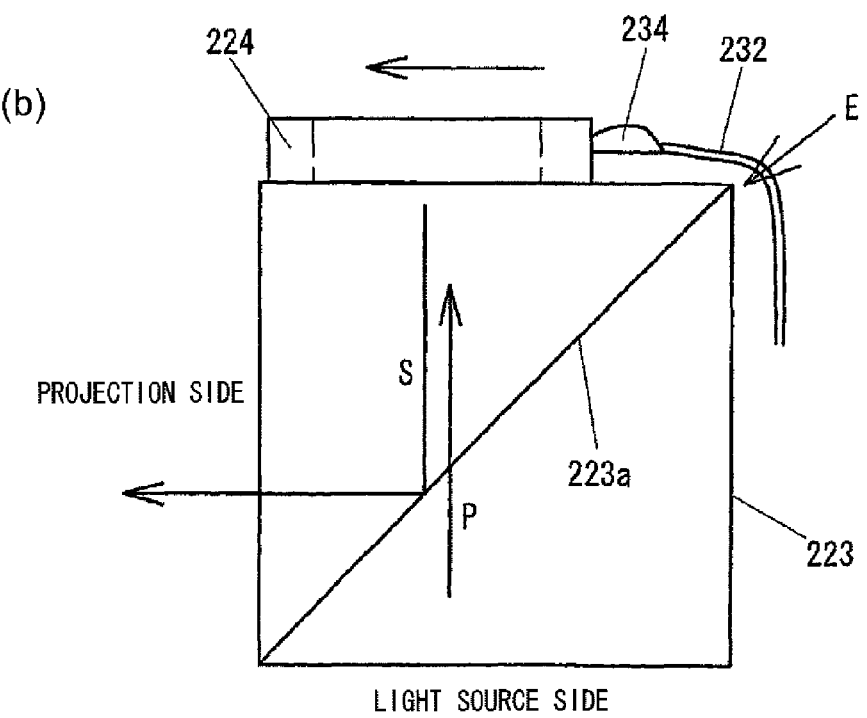

PROJECTOR APPARATUS

TECHNICAL FIELD

The present invention relates to a projector apparatus.

BACKGROUND ART

The projector apparatuses known in the related art include those configured as compact units and mounted on digital cameras and the like (see, for instance, patent references 1 and 2). When guiding illuminating light to be used for image read, to an image display device, a projector apparatus converts the illuminating light originating from a light source to parallel light via a condenser lens and obtains polarized light as the parallel light travels through a polarization beam splitter (PBS). The image display device may be constituted with, for instance, a rectangular reflection-type liquid crystal display element.

Patent reference 1: Japanese Laid Open Patent Publication No. 2002-287084

Patent reference 2: Japanese Laid Open Patent Publication No. 2005-250392

DISCLOSURE OF THE INVENTION

Problems to be Solved by the Invention

However, when the light source and the PBS are disposed close to each other in order to achieve miniaturization of the projector apparatus, light departing the condenser lens is bound to become offset from parallel light, resulting in a phenomenon of shading. In addition, since the illuminating light transmitted via the PBS irradiates a peripheral area beyond the display area at the display element, the illuminating light is not utilized with maximum efficiency. Thus, the attempts at projector apparatus miniaturization tend to adversely affect the optical performance of the projector.

According to the 1st aspect of the present invention, a projector apparatus comprises: a polarization beam splitter block assuming a shape of a rectangular parallelepiped that includes two end surfaces ranging orthogonally relative to a polarization beam splitting surface and four side surfaces perpendicular to the end surfaces; a light source disposed so as to face opposite one of the side surfaces of the polarization beam splitter block; an illumination optical system that is disposed between the light source and the polarization beam splitter block, and converts illuminating light emitted from the light source to substantially parallel light so as to direct the substantially parallel light to the polarization beam splitter block; a reflection-type liquid crystal display element that is disposed so as to face opposite an illuminating light output surface of the polarization beam splitter block, through which an illuminating light having undergone polarization separation at the polarization beam splitting surface is output, and includes a rectangular display area through which the illuminating light having undergone the polarization separation is modulated to modulated light and the modulated light is output to the polarization beam splitter block; and a projection optical system that forms a projection image with light obtained by subjecting the modulated light to polarization separation at the polarization beam splitting surface, wherein: the reflection-type liquid crystal display element is disposed so as to set shorter borders of the rectangular display area parallel to the end surfaces.

It is preferred that the shorter borders of the rectangular display area are set parallel to the end surfaces so as to reduce an extent to which polarization beam splitting characteristics at the polarization beam splitting surface are adversely affected by deviation of the light departing the illumination optical system from an ideal parallel state.

It is possible that a surface light source is used as the light source.

It is preferred that the reflection-type liquid crystal display element is disposed so that the rectangular display area faces opposite an area further inside relative to a total reflection light output area set at a periphery of the illuminating light output surface.

Furthermore, it is preferred that the projector apparatus projects a rectangular projection image which is laterally elongated along a horizontal direction frontward relative to the apparatus; and the light source, the illumination optical system, the polarization beam splitter block and the reflection-type liquid crystal display element are disposed in a single row along a vertical direction and the reflection-type liquid crystal display element is disposed so that longer borders of the rectangular display area extend parallel to longer sides of the rectangular projection image.

It is preferred that the projector apparatus projects a rectangular projection image which is laterally elongated along a horizontal direction frontward relative to the apparatus; and the light source, the illumination optical system and the polarization beam splitter block are disposed in a single row along a vertical direction and the reflection-type liquid crystal display element and the polarization beam splitter block are disposed in a single row along a projecting direction so that longer borders of the rectangular display area extend parallel to longer sides of the rectangular projection image.

According to the 2nd aspect of the present invention, a projector apparatus comprises: a polarization beam splitter block assuming a shape of a rectangular parallelepiped that includes two end surfaces ranging orthogonally relative to a polarization beam splitting surface and four side surfaces perpendicular to the end surfaces; a light source disposed so as to face opposite one of the side surfaces of the polarization beam splitter block; an illumination optical system that is disposed between the light source and the polarization beam splitter block, and converts the illuminating light emitted from the light source to substantially parallel light so as to direct the substantially parallel light to the polarization beam splitter block; a reflection-type liquid crystal display element that is disposed so as to face opposite an illuminating light output surface of the polarization beam splitter block, through which an illuminating light having undergone polarization separation at the polarization beam splitting surface is output, and includes a rectangular display area through which the illuminating light having undergone the polarization separation is modulated to modulated light and the modulated light is output to the polarization beam splitter block; and a projection optical system that forms a projection image with light obtained by subjecting the modulated light to polarization separation at the polarization beam splitting surface, wherein: the reflection-type liquid crystal display element is disposed so that the rectangular display area faces opposite an area further inside relative to a total reflection light output area set at a periphery of the illuminating light output surface.

According to the 3rd aspect of the present invention, a projector apparatus comprises: a polarization beam splitter block assuming a shape of a rectangular parallelepiped that includes two end surfaces ranging orthogonally relative to a polarization beam splitting surface and four side surfaces perpendicular to the end surfaces; a light source disposed so as to face opposite one of the side surfaces of the polarization beam splitter block; an illumination optical system that is disposed between the light source and the polarization beam splitter block, and converts illuminating light emitted from the light source to substantially parallel light so as to direct the substantially parallel light to the polarization beam splitter block; a reflection-type liquid crystal display element that is disposed so as to face opposite and illuminating light output surface of the polarization beam splitter block, through which an illuminating light having undergone polarization separation at the polarization beam splitting surface is output, and includes a rectangular display area through which the illuminating light having undergone the polarization separation is modulated to modulated light and the modulated light is output to the polarization beam splitter block; and a projection optical system that forms a projection image with light obtained by subjecting the modulated light to polarization separation at the polarization beam splitting surface, wherein: the illumination optical system imparts greater refractive power along shorter borders of the rectangular display area than along longer borders of the rectangular display area.

It is preferred that the reflection-type liquid crystal display element is disposed so that the shorter borders of the rectangular display area extend parallel to the end surfaces in order to reduce an extent to which polarization beam splitting characteristics at the polarization beam splitting surface are adversely affected by deviation of the light departing the illumination optical system from an ideal parallel state.

Furthermore, it is possible that the reflection-type liquid crystal display element is disposed so that the rectangular display area faces opposite an area further inside relative to a total reflection light output area set at a periphery of the illuminating light output surface.

It is possible that the illumination optical system is configured to a single lens having one surface thereof formed as a cylindrical surface or is configured to a single lens that includes a non-spherical surface.

Effect of the Invention

According to the present invention adopting the structure described above, the extent to which the optical performance is adversely affected through miniaturization of the projector apparatus can be reduced.

BRIEF DESCRIPTION OF THE DRAWINGS

FIG. 1 A digital camera equipped with a projector apparatus achieved in an embodiment, with (a) showing the digital camera in a non-operating state and (b) showing the digital camera in a projecting state;

FIG. 3 Schematic illustrations of the structure adopted in the liquid crystal display element 224, with (a) showing the liquid crystal display element in a plan view and (b) showing the liquid crystal display element in a side elevation;

FIG. 7 The relationship between the light entry angle α and the polarization beam splitting performance;

FIG. 13 Detailed illustrations of the mask 228, with (a) showing the mask in a perspective and (b) showing the mask in a sectional view taken along B1-B1;

FIG. 14 Another example of the mask 228, with (a) showing the mask in a perspective and (b) showing the mask in a sectional view taken along B2-B2;

FIG. 15 The position assumed by the phase difference plate relative to the PBS 223 shown in a sectional view in (a) and in an enlargement in (b);

FIG. 17 The position assumed by the liquid crystal display element 224 relative to the PBS 223 shown in a plan view in (a) and in a side elevation in (b);

BEST MODE FOR CARRYING OUT THE INVENTION

Figure 2:
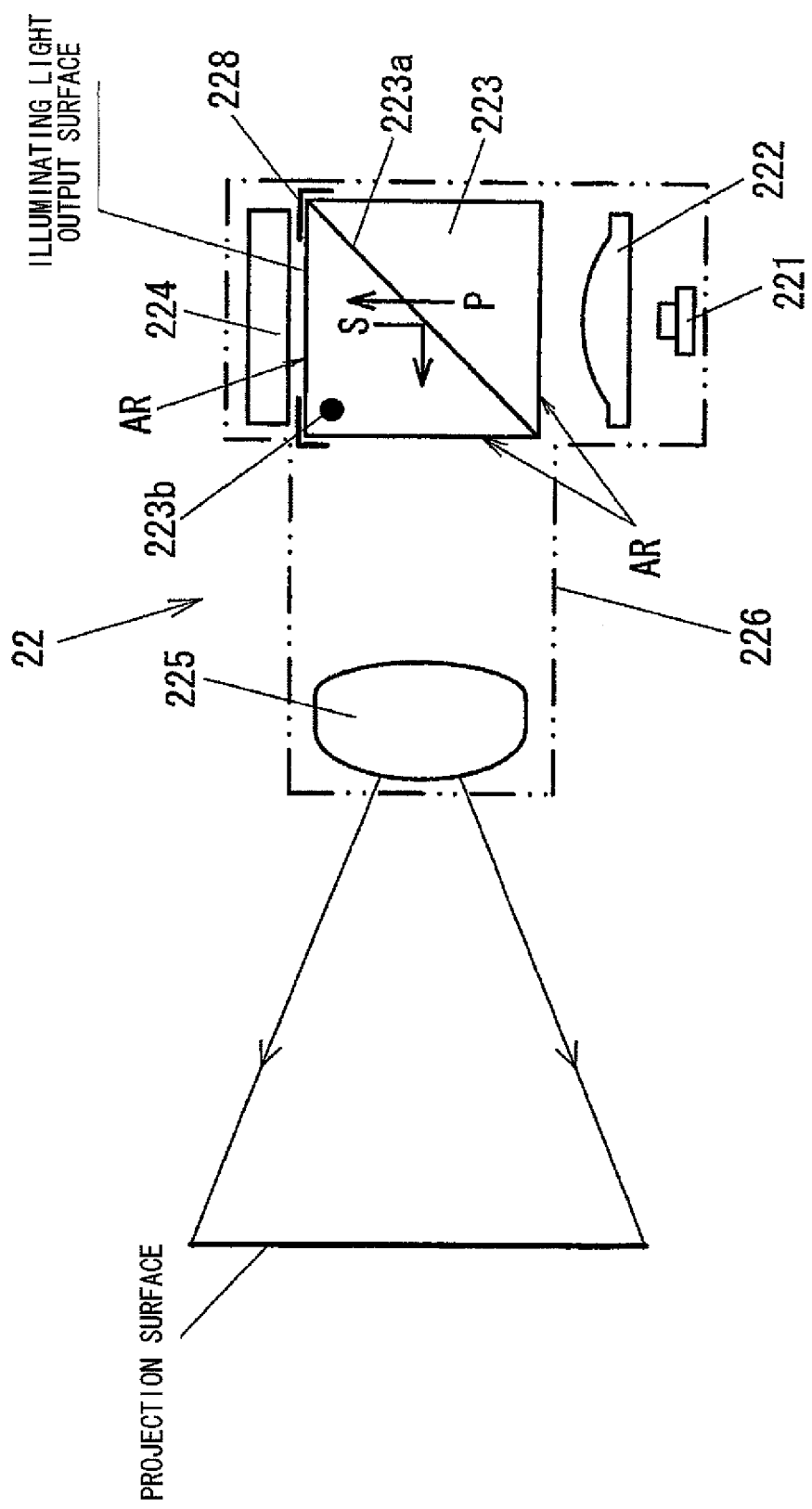
FIG. 2 The structure of the projector unit 22.

The following is a description of the best mode for carrying out the present invention, given the reference to the drawings. The projector apparatus according to the present invention is an ultra-compact projector apparatus mounted on a camera, a portable device or the like. FIG. 1 shows a digital camera equipped with the projector apparatus achieved in an embodiment. The digital camera 1 includes a main body 10 and a lens barrel body 20. The lens barrel body 20 is attached via a link mechanism (not shown) so as to be allowed to rotate relative to the main body 10.

FIG. 1(a) shows the digital camera in a non-operating state in which the lens barrel body 20 is not rotated relative to the main body 10. At the top surface of the main body 10, a power switch 106, a shutter release button 107 operated to engage the digital camera in photographing operation and a PJ button 108 operated to turn on/off a projector apparatus (hereafter referred to as a projector unit) 22 are disposed.

FIG. 1(b) shows the digital camera in a projecting state in which the lens barrel body 20 has been rotated by 90° relative to the main body 10. A photographing unit 21 equipped with an image sensor and the projector unit 22 are disposed at the lens barrel body 20. A photographic lens 210 in the photographing unit 21 is disposed toward the upper end of the lens barrel 20 in the state shown in FIG. 1(a). A projection window 22a of the projector unit 22, on the other hand, is disposed toward the bottom surface of the lens barrel 20. As the projection window 22a is turned to the front of the camera by rotating the lens barrel 20 and the PJ button is operated to turn on the projector unit, a projection image is projected out front of the camera.

It is to be noted that an image projected by the projector unit 22 is expressed based upon image data stored in a recording medium in the main body 10 or image data obtained by engaging the photographing unit 21 in photographing operation.

FIG. 2 schematically illustrates the structure of the projector unit 22. The projector unit 22 includes a light source 221 constituted with, for instance, a high-luminance white LED, a condenser lens 222, a polarization beam splitter (PBS) 223, a liquid crystal display element 224, a projection lens 225 and a mask 228 all housed within a case 226. The liquid crystal display element 224 is disposed in tight contact with a side surface (illuminating light output surface) of the PBS 223. The liquid crystal display element 224 is constituted with a reflection-type liquid crystal panel such as an LCOS. The liquid crystal display element 224 achieved in the embodiment is a reflection-type color liquid crystal panel which includes light receiving elements each equipped with a color filter disposed in a two-dimensional array.

It is to be noted that in the description of the embodiment, a surface of the PBS 223 ranging perpendicular to the surface of the drawing sheet on which FIG. 2 is presented is referred to as a side surface and surfaces ranging perpendicular to the four side surfaces are referred to as end surfaces. Such a PBS 223 may be formed by pasting together a pair of triangular prisms with a polarization splitter film inserted between them. The polarization splitter film 223a is formed so as to range perpendicular to the two end surfaces of the PBS 223 and the liquid crystal display element 224 is disposed at a side surface of the PBS 223.

Light originating from the light source 221 is converted to substantially parallel light at the condenser lens 222 and the substantially parallel light departing the condenser lens is directed to enter the PBS 223. The polarization splitter film 223a at the PBS 223 is formed with a 45° tilt relative to the optical axis of the incoming illuminating light and P polarized light in the light having entered the PBS 223 is transmitted through the polarization splitter film 223a and illuminates the liquid crystal display element 224.

The light having entered the liquid crystal display element 224 advances through the liquid crystal layer, is reflected at a reflector electrode of the liquid crystal display element 224, travels through the liquid crystal along the reverse direction and finally exits the liquid crystal display element 224. Since the liquid crystal layer functions as a phase plate when a voltage is applied thereto, P polarized light entering a pixel area where the voltage is applied is converted to S polarized light by the time it exits the liquid crystal display element 224 and P polarized light is output at a pixel area where no voltage is applied. For instance, assuming a monochrome image is on display at the liquid crystal display element 224, the P polarized light is modulated to S polarized light over white areas but P polarized light is output at black areas.

It is to be noted that since a reflection loss of approximately 4~8% is bound to occur at optical glass under normal circumstances, an antireflection coating is applied onto the surfaces indicated by AR in FIG. 2 in order to prevent any significant loss of light at the entry/exit surfaces of the PBS 223. As a result, since significant light loss is prevented at the individual surfaces of the PBS 223, a high level of transmittance is assured. With the antireflection coating, which may be constituted with, for instance, a dielectric multilayer film, an improvement of approximately 5% is achieved with regard to the amount of light transmitted through each surface. At an end surface of the PBS 223, a marking 223b, to be used to verify the correct positioning of the PBS 223 during the assembly process, is formed.

As described above, the P polarized light having entered the liquid crystal display element 224 is modulated in correspondence to the image on display. The modulated light having exited the liquid crystal display element 224 reenters the PBS 223 where it undergoes a process of polarization separation at the polarization splitter film 223a. Namely, the P polarized light in the modulated light is transmitted through the polarization splitter film 223a whereas the S polarized light is reflected at the polarization splitter film 223a and is directed toward the projection lens 225. An image is formed on the projection surface via the projection lens 225 with the S polarized light reflected at the polarization splitter film 223a.

FIG. 3 presents schematic illustrations of the structure adopted in the liquid crystal display element 224, with (a) showing the liquid crystal display element in a plan view and (b) showing the liquid crystal display element in a side elevation. The liquid crystal display element constituted with an LCOS display element assumes a structure which includes a liquid crystal layer held between a silicon substrate 231 with a reflector electrode formed thereat and a glass substrate 230 with a transparent electrode formed thereat. The light originating from the light source 221 enters the liquid crystal display element through the side where the glass substrate is located. Reference numeral 232 indicates a flexible printed circuit board (FPC) and a connector unit 234 is molded with resin or the like.

The embodiment is described by quoting reference numeral 240a when referring to a longer border of a display area 240 and quoting reference numeral 240b when referring to a shorter border of the display area 240. In addition, each side of the liquid crystal display element 224 on which a longer border 240a is located is referred to as a longer side and each side of the liquid crystal display element 224 on which a shorter border 240b is located is referred to as a shorter side, as shown in FIG. 3. The rectangular area defined with a dotted line is the display area 240 within which an image corresponding to the projection image is displayed. The connector unit 234, which connects the FPC 232, located on a longer side of the liquid crystal display element 224, is formed so as to project further out beyond the edges of the glass substrate 230 and the silicon substrate 231.

Figure 4:
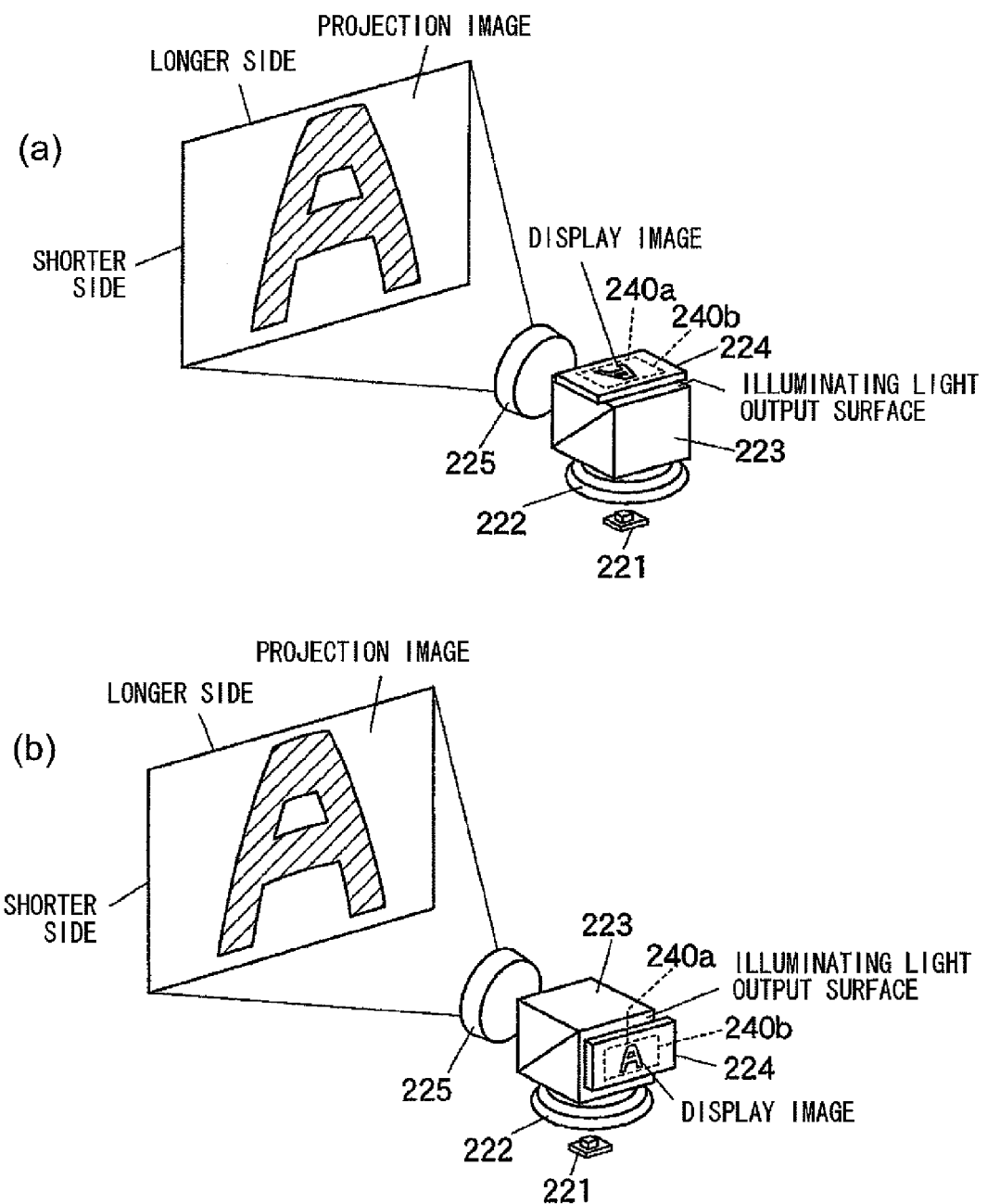
FIG. 4 Illustrations of positional relationships assumed by the liquid crystal display element 224 and the projection image, with (a) showing a positional relationship that may be assumed when P polarized light is used as the illuminating light and (b) showing a positional relationship that may be assumed when S polarized light is used as the illuminating light.

FIG. 4(a) shows a relationship that may be assumed between the image displayed at the liquid crystal display element 224 and the projection image. The liquid crystal display element 224 is positioned so as to project an upright rectangular projection image over the projection surface by setting the longer borders 240a of the display area 240 parallel to the longer sides of the projection image. By assuming such a positional arrangement, a reduction in the number of parts required to configure the projector unit 22 and miniaturization of the projector unit 22 are achieved. For instance, if the liquid crystal display element 224 were disposed by setting the shorter borders 240b of the display area 240 parallel to the longer sides of the projection image in FIG. 4(a), an optical system via which the image can be rotated by 90° would have to be disposed in order to project an upright image such as that shown in FIG. 4(a) over the projection surface, which would result in an increase in the number of parts and also increase the bulk of the projector unit.

It is to be noted that the positional arrangement for the liquid crystal display element 224 shown in FIGS. 2 and 4(a) is assumed when P polarized light separated via the polarization splitter film 223a is used as the illuminating light. If, on the other hand, S polarized light is to be used as the illuminating light, the liquid crystal display element 224 should be disposed at a position on the opposite side from the projection lens 225 across the PBS 223 as shown in FIG. 4(b). In this case, too, by ensuring that the longer borders 240a of the display area 240 are set parallel to the longer sides of the projection image when positioning the liquid crystal display element 224, advantages similar to those of the positional arrangement shown in FIG. 4(a) are achieved.

Figure 5:
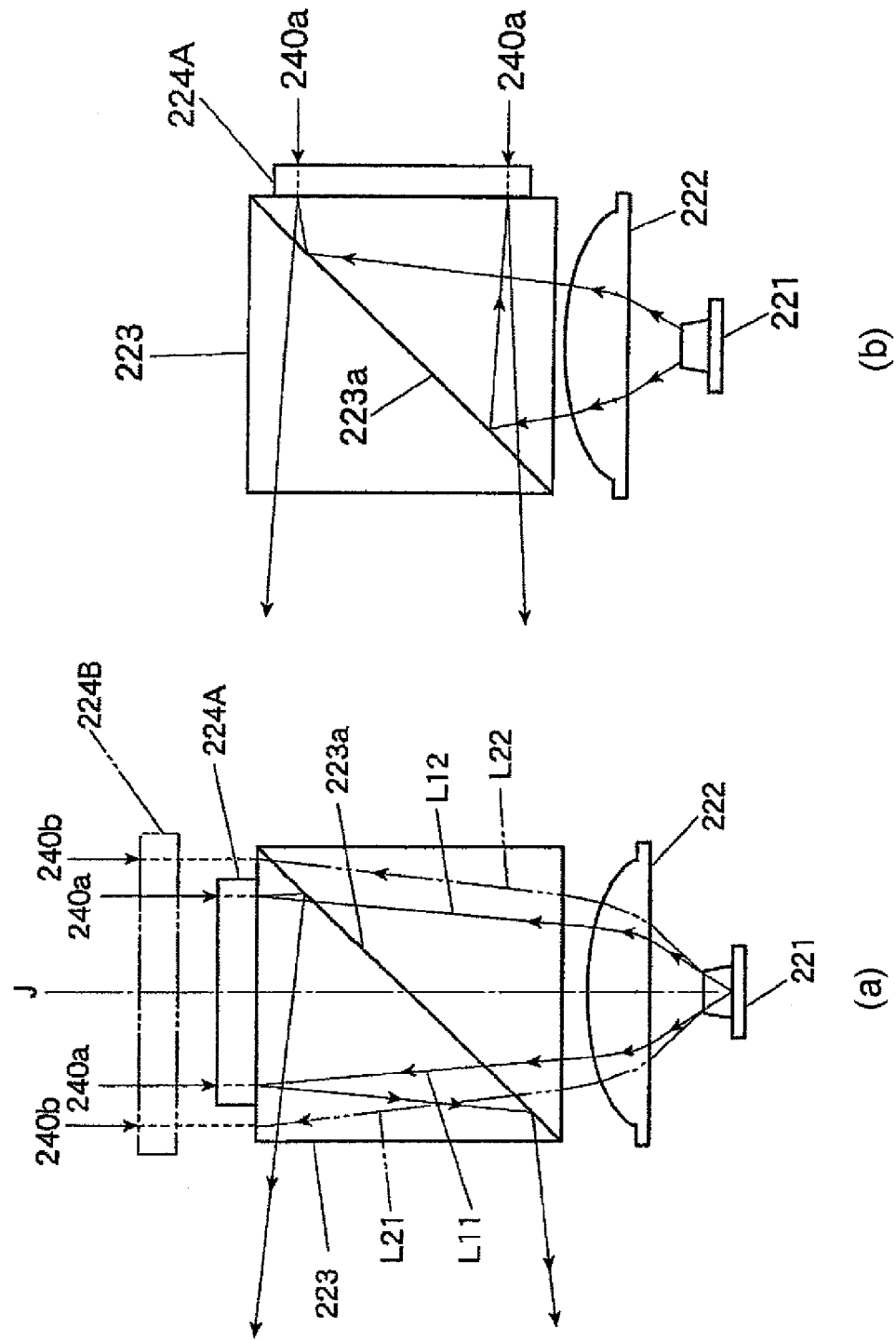
FIG. 5 Illustrations of light rays departing the condenser lens 222, with (a) showing light rays departing the condenser lens when P polarized light is used as the illuminating light and (b) showing light rays departing the condenser lens when S polarized light is used as the illuminating light.

When the projector unit 22 is configured as an ultra-compact unit as in the embodiment, the distance between the light source 221 and the PBS 223 is extremely small. This means that the illuminating light cannot easily be converted to perfectly parallel light via the condenser lens 222, i.e., an optical element that converts light emitted from the light source 221 to parallel light and instead, a light beam assuming the shape of a circular cone, which includes light exiting along diagonal directions will be formed, as shown in FIG. 5. In FIG. 5, (a) shows the light beam formed when P polarized light is used as the illuminating light in a configuration in which the liquid crystal display element 224 and the light source 221 are disposed so as to face opposite each other with the PBS 223 disposed therebetween. (b) in FIG. 5, on the other hand, illustrates a positional arrangement that may be adopted when using S polarized light as the illuminating light.

Figure 6:
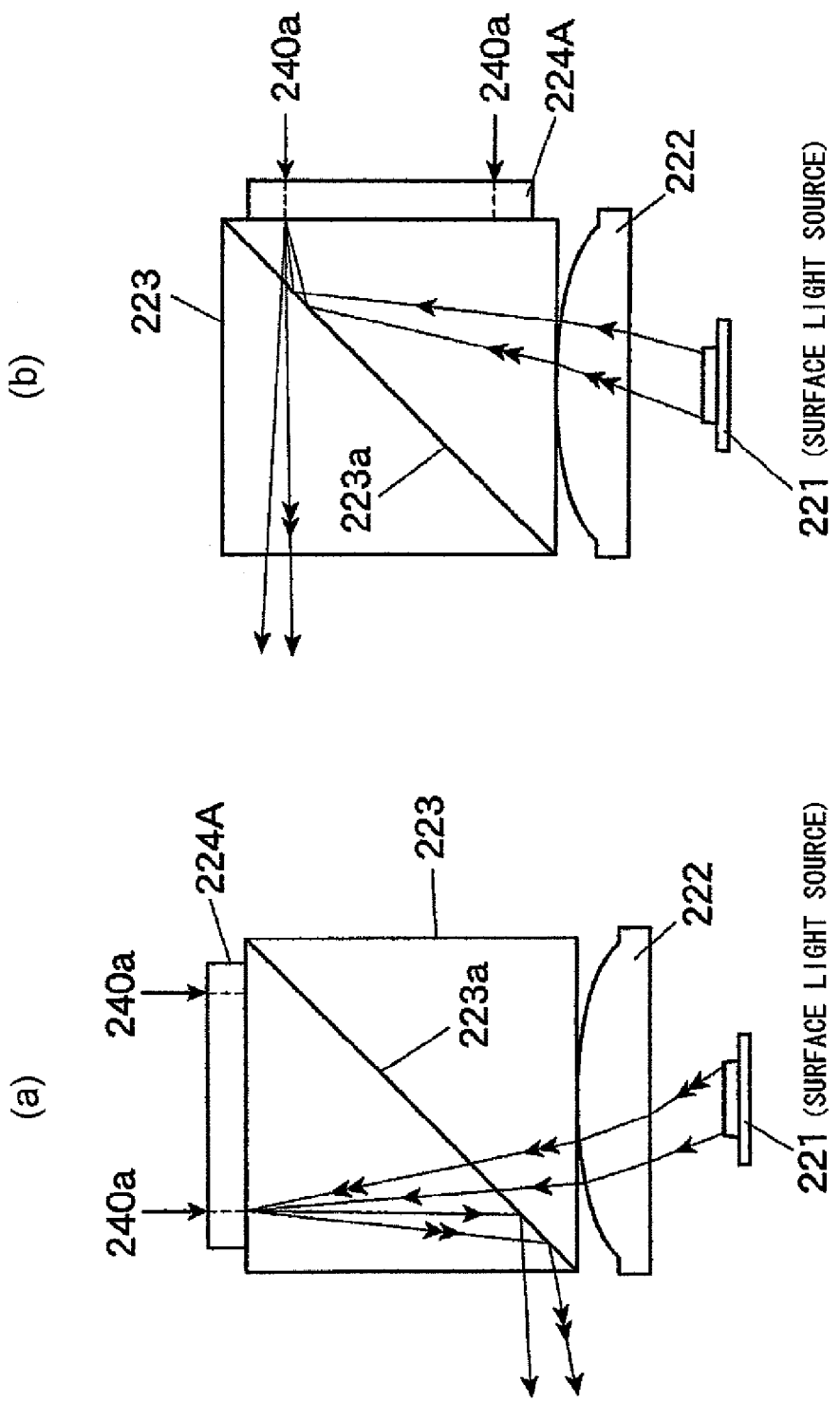
FIG. 6 Illustrations of light rays originating from the light source constituted with a surface light source with (a) showing light rays originating from the surface light source when P polarized light is used as the illuminating light and (b) showing light rays originating from the surface light source when S polarized light is used as the illuminating light.

In addition, parallel light cannot be formed if the light source 221 is constituted with a surface light source such as that shown in FIG. 6. FIG. 6 illustrates positional arrangements that may be adopted in conjunction with the light source 221 constituted with a surface light source and the rays of light exiting the left and right ends of the surface light source and entering a specific point of the display element will have entered the polarization splitter film of the PBS with different entry angles. As in FIG. 5, (a) and (b) in FIG. 6 respectively illustrate the positional arrangement assumed in conjunction with P polarized light used as the illuminating light and the positional arrangement assumed in conjunction with S polarized light used as the illuminating light.

((Reducing the Extent of Shading))

The liquid crystal display element 224A indicated by the solid line in FIG. 5(a) is disposed so that the shorter borders 240b of the display area 240 extend to the left and right in the figure. The liquid crystal display element 224B indicated by the two-point chain line, on the other hand, is disposed by ensuring that the longer borders 240a of the display area 240 extend to the left and right. In addition, rays of light L11 and L12 are illuminating light rays that enter the boundary areas on the left side and the right side of the display area 240 at the liquid crystal display element 224A (the areas over which the longer borders 240a are present). Likewise, rays of light L21 and L22 are illuminating light rays that enter the boundary areas on the left side and the right side of the display area 240 at the liquid crystal display element 224B (the areas over which the shorter borders 240b are present).

As shown in FIG. 3, the display area 240 at the liquid crystal display element 224 assumes a rectangular shape, and accordingly, the opening angles (the tilt angles relative to the optical axis J) formed with the rays L21 and L22 as they enter the polarization splitter film 223a are greater than the opening angles formed with the rays L11 and L12 as they enter the polarization splitter film 223a.

As shown in FIG. 5(a), Rays L21 and L22 form first divergent light, and Rays L11 and L12 form second divergent light with smaller divergent angle than the first divergent light.

The polarization beam splitting performance of the PBS 223 is affected by the angle of the light entering the polarization splitter film 223a. FIG. 7 illustrates the relationship between the angle $\alpha$ of the light and the polarization beam splitting performance, with (a) illustrating the angle $\alpha$ formed by the polarization splitter film 223a and the illuminating light and (b) presenting the wavelength dependency of the P polarized light transmittance. It is to be noted that FIG. 7(b) shows a schematic diagram indicating the P polarized light transmittance measured when the angle $\alpha$ formed by the incoming light and the polarization splitter film 223a is 35° and when the angle $\alpha$ is 55°.

While a substantially uniform transmittance is observed within a wavelength range of 450 nm~700 nm when the angle $\alpha$ is 55°, the transmittance decreases as the wavelength decreases from 700 nm to 600 nm and the transmittance assumes a substantially constant value within the wavelength range of 450 nm through 600 nm when the angle $\alpha$ is 35°. For this reason, even when a singular color is to be expressed in areas on the liquid crystal display element 224, an area where the light with an entry angle $\alpha$ of 35° is projected takes on a more reddish tint compared to an area where the light with an entry angle $\alpha$ of 55° is projected. Such a tinting phenomenon is normally referred to as shading.

Figure 8:
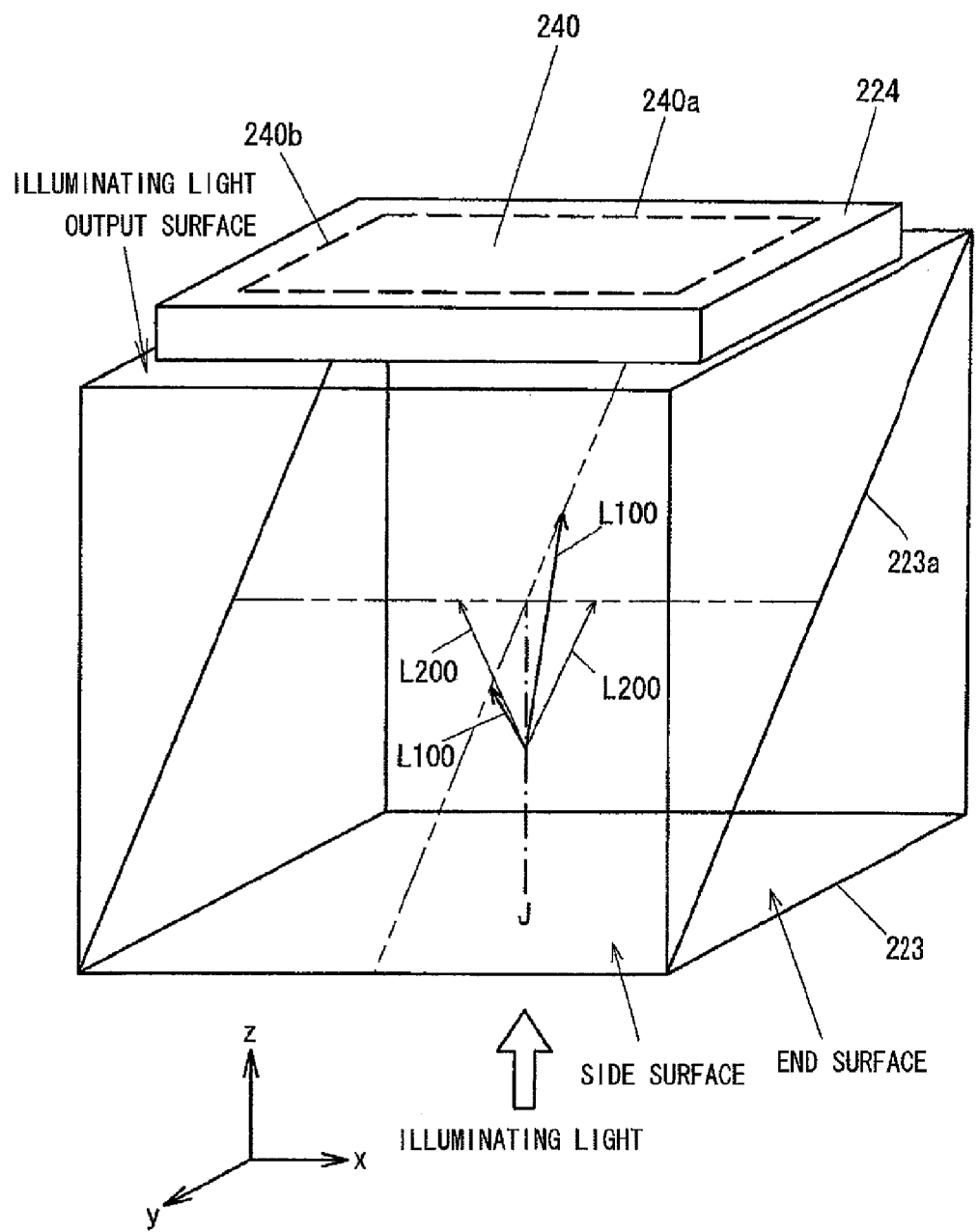
FIG. 8 A perspective showing the PBS 223 and the liquid crystal display device 224.

The relationships shown in FIG. 7(b) are observed in relation to the opening angles measured within the yz plane indicated by the bold-line arrow L100 in FIG. 8, i.e., in relation to the opening angles measured along the direction in which the shorter borders 240b of the display area 240 extend. The angles measured within the xz plane indicated by the thin-line arrow L200 in FIG. 8, i.e., the opening angles measured along the direction in which the longer borders 240a of the display area 240 extend, do not affect the transmittance as much as the angles measured within the yz plane.

Accordingly, the shorter borders 240b of the liquid crystal display element 224 are set parallel to the end surfaces of the PBS 223 so as to align the direction in which the longer sides of the display area 240 extend over a greater range is aligned with the direction along which the polarization splitter film 223a extends (along the x direction). Namely, the longer borders 240a of the display area 240 are set to extend along the x direction and the shorter borders 240b of the display area are set to extend along the y direction. By adopting this positional arrangement, the opening angle measured along the y direction, in which the shading phenomenon is more significant, can be reduced so as to effectively minimize the adverse effects of the shading phenomenon.

((Ghosting Prevention))

Figure 9:
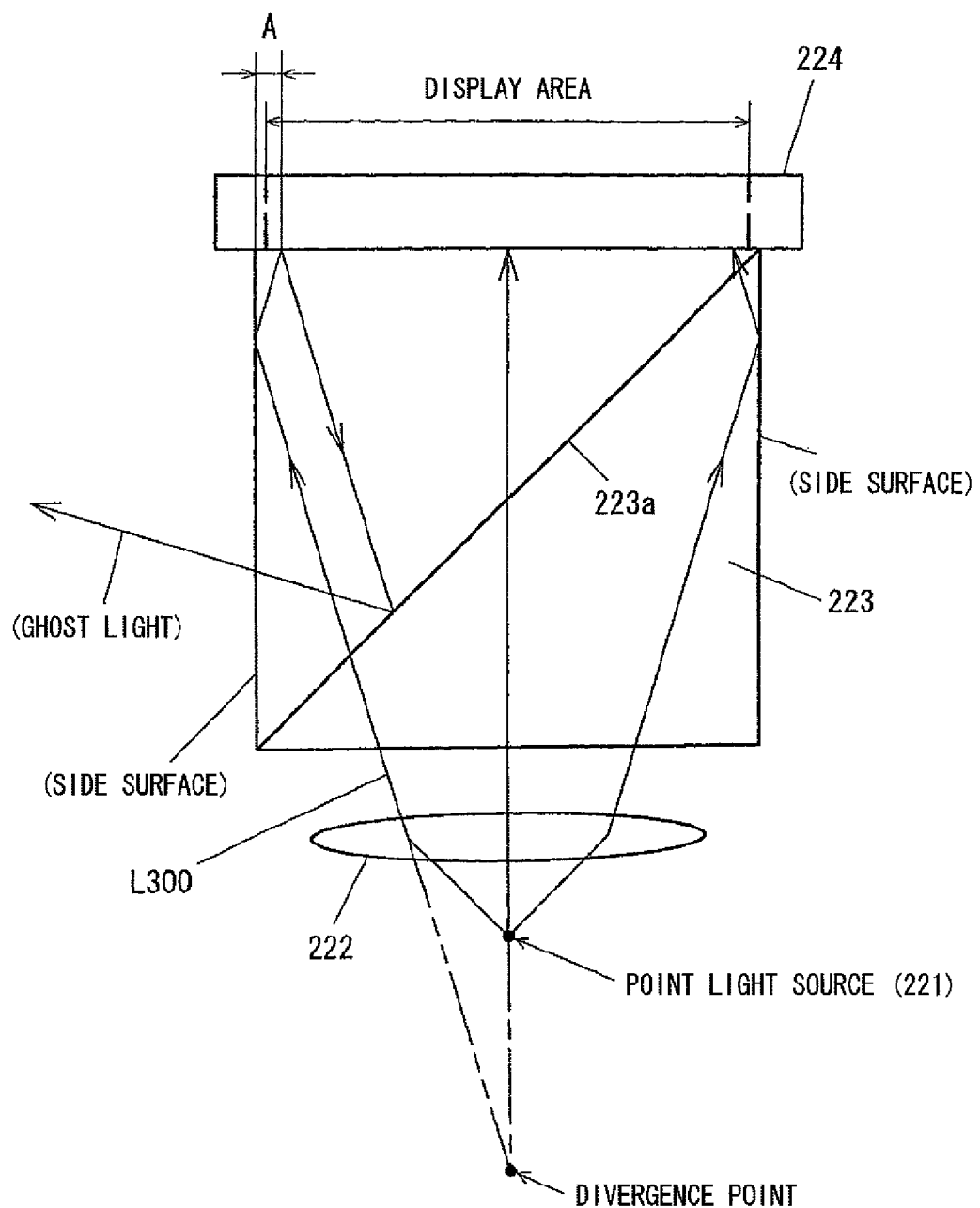
FIG. 9 An illustration showing how ghosting may occur.

FIG. 9 illustrates how the phenomenon referred to as ghosting may occur when the dimensions of the PBS 223 are reduced in an attempt to miniaturize the projector. Assuming that the light source 221 is a point light source, some (L300) of the light emitted along a diagonal direction from the light source 221 enters the PBS 223 and is then totally reflected at a side surface of the PBS 223 before it exits over range (total reflection light output area) indicated by the letter A. Once the light L300 having been totally reflected within the PBS block enters the display area 240 at the liquid crystal display element 224, it is reflected at the liquid crystal display element 224 and is then reflected by the polarization splitter film 223a toward the projection lens 225, which readily causes the ghosting phenomenon.

In order to prevent the occurrence of such a ghosting phenomenon, the dimensions of the PBS 223 must be set so as to ensure that the display area 240 is positioned further inward relative to the range A over which the total reflection light is output. Assuming that the distance between the light source 211 and the liquid crystal display element 224 remains unchanged in FIG. 9, the dimension of the range through which the total reflection light enters becomes greater as the width of the PBS 223 measured along the left/right direction in the figure becomes smaller and the dimension of the range over which the total reflection light enters is reduced as the width becomes greater.

Figure 10:
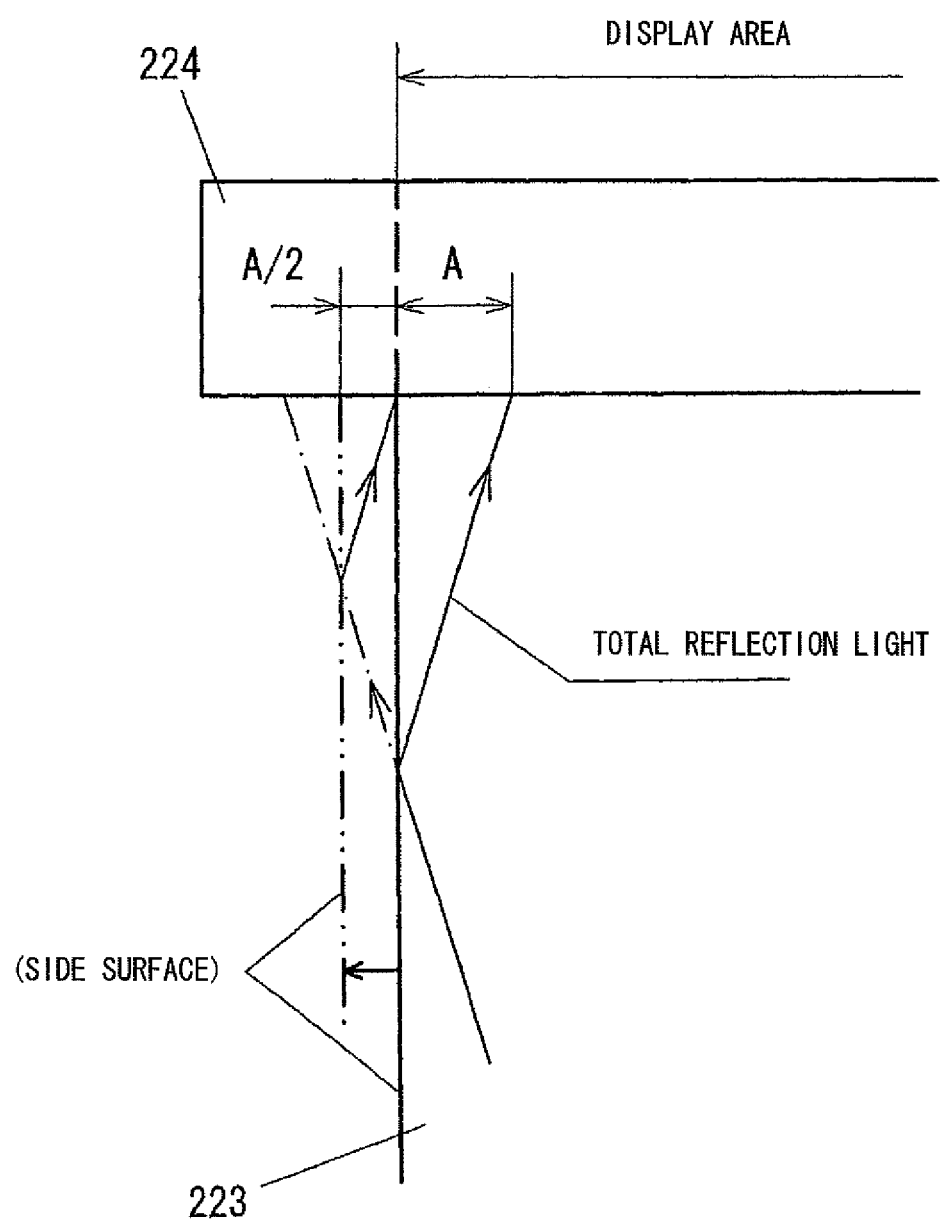
FIG. 10 An illustration of the total reflection light output area.

FIG. 10 shows the total reflection area in FIG. 9 in an enlargement. In FIG. 10, the position of the dotted line indicating the boundary of the display area is adjusted to match the position of the side surface of the PBS 223. In this example, if the side surface of the PBS 223 is displaced by a distance A/2 to the left in the figure as indicated by the two-point chain line in FIG. 10, i.e., if the width of the PBS 223 measured along the left/right direction is increased by A, entry of the light having been totally reflected at the side surface into the display area 240 at the liquid crystal display element 224 can be prevented. The dimension of the area indicated by the letter A can be estimated based upon the dimensions of the display area and the distance between the divergence point at which the illuminating light diverges to form the shape of a circular cone, as shown in FIG. 9, and the display area.

Figure 11:
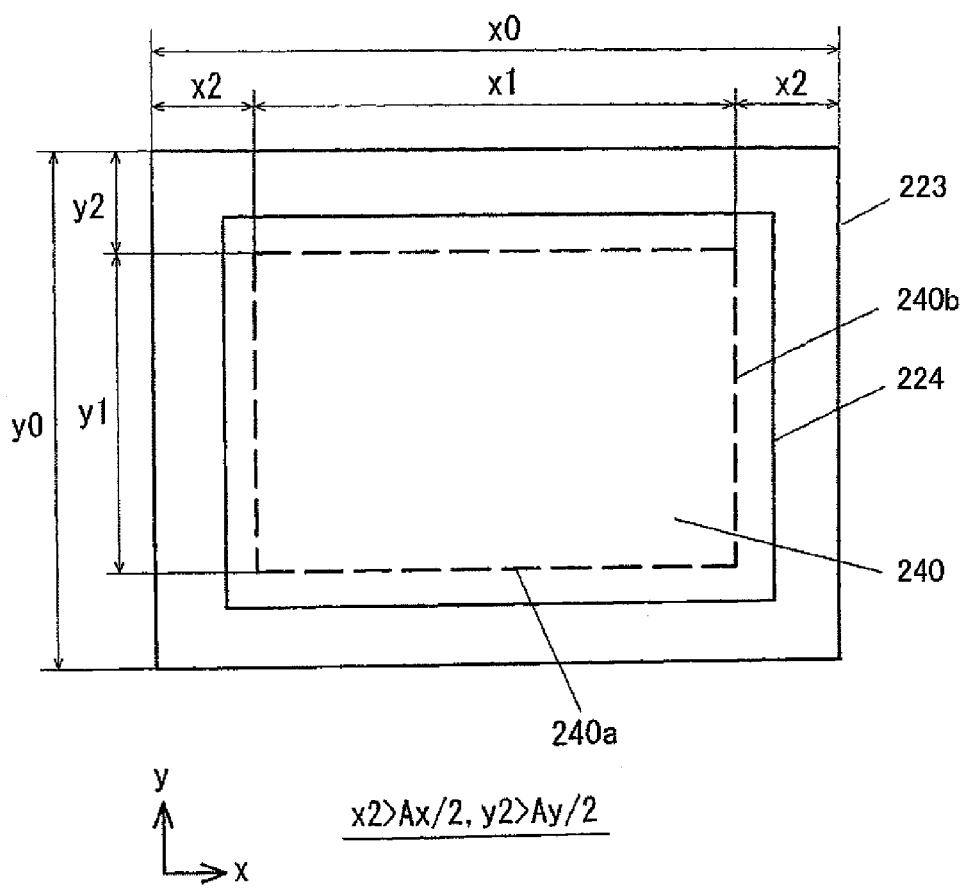
FIG. 11 An illustration of the display area 240 at the liquid crystal display element 224.

FIG. 11 shows the PBS 223 and the liquid crystal display element 224 in FIG. 8, viewed from the minus side along the z axis. x0 and y0 indicate the dimensions of the PBS 223, respectively taken along the longer sides thereof (along the left/right direction in the figure) and taken along the shorter sides thereof (along the up/down direction in the figure). Namely, the PBS 223 assumes a rectangular parallelepiped shape. In addition, assuming that the dimension x0 is equal to the dimension x1 of the display area 240 taken along the longer borders 240a thereof, the dimension of the range A over which the total reflection light enters is indicated as Ax. Accordingly, by setting the dimension x0 as expressed in (1) below, it is ensured that the total reflection light does not enter the display area 240 so as to prevent occurrence of any ghosting phenomenon along the longer sides. Namely, x2 in FIG. 11 should be set so that x2>Ax/2.

$$x0>x1+Ax/2 \quad (1)$$

Likewise, assuming that the dimension y0 taken along the shorter sides is equal to the dimension y1 of the display area 240 taken along the shorter borders 240b thereof, the dimension of the range A over which the total reflection light enters is indicated as Ay. Accordingly, by setting the dimension y0 as expressed in (2) below, it is ensured that the total reflection light does not enter the display area 240 so as to prevent occurrence of any ghosting phenomenon along the shorter sides. Namely, y2 in FIG. 11 should be set so that y2>Ay/2. It is to be noted that as FIG. 10 clearly indicates, the dimension of the range A taken along the shorter sides is greater and thus Ay>Ax is true.

$$y0>y1+Ay/2 \quad (2)$$

Figure 12:
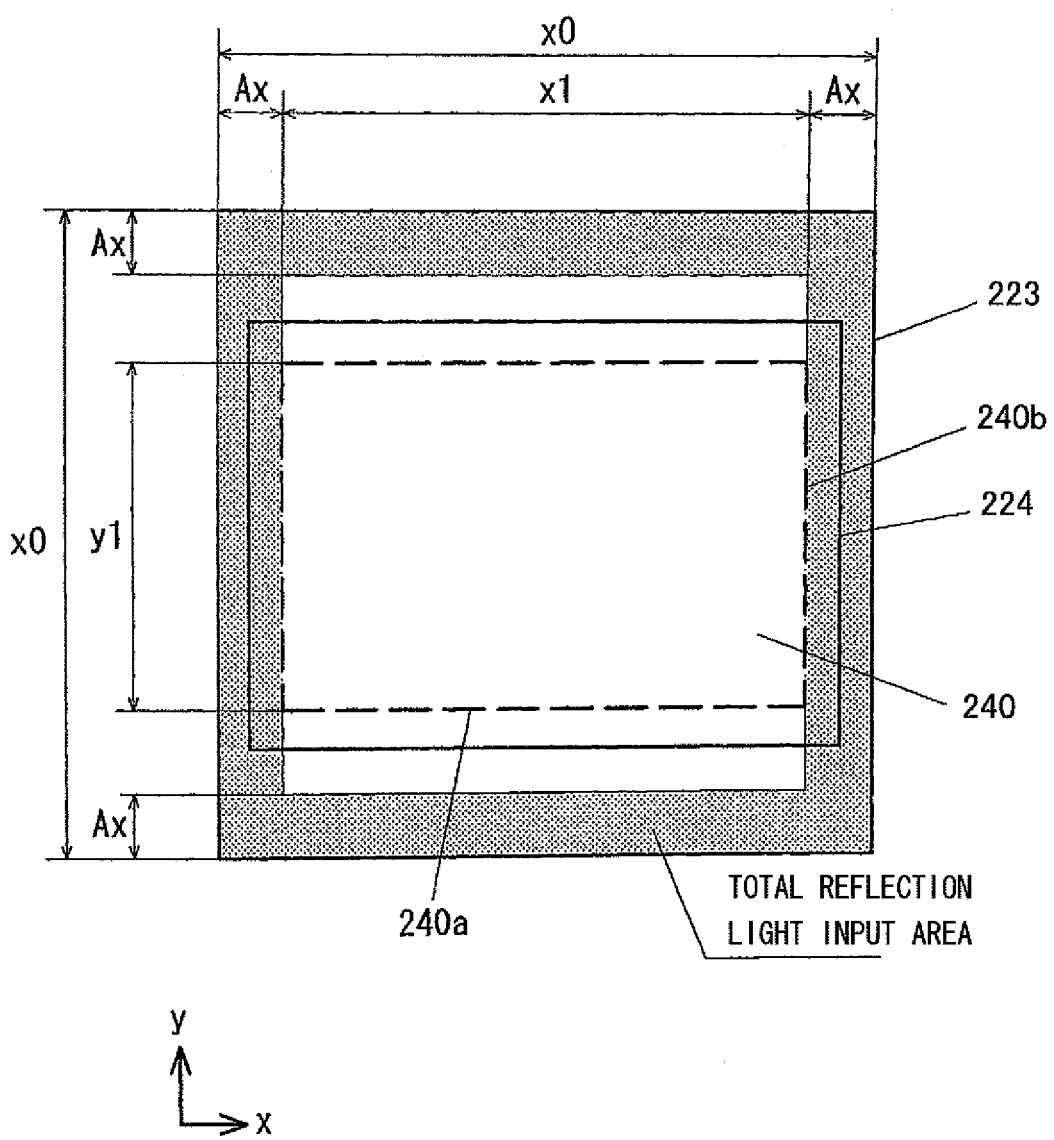
FIG. 12 A total reflection light output area that may be assumed in conjunction with a cubic PBS 223.

If, on the other hand, the PBS 223 assumes a cubic shape, as shown in FIG. 12, i.e., if x0=y0, each side assumes the length x0 as expressed in (1) so as to satisfy the ghost-preventing requirement for preventing the ghosting phenomenon along the longer sides described above. The hatched area is the total reflection light output area through which the total reflection light is output. Since the display area 240 assumes a smaller width along the y direction in comparison to the x direction, the dimension of the PBS 223 taken along the y direction assures an ample margin relative to the display area with regard to ghosting prevention.

((Effects of the Mask))

FIG. 13 shows the mask 228 in detail, with (a) showing the mask in a perspective view and (b) showing it in a sectional view taken along B1-B1. It is to be noted that the sectional view taken along B1-B1 also includes an illustration of the liquid crystal display element 224. As shown in FIGS. 11 and 12, the range of the illuminating light output surface at the PBS 223 will be greater than the range of the display area 240 by at least an extent corresponding to the areas Ax and Ay, even when the PBS 223 is configured as a compact unit to achieve miniaturization of the projector unit 22. For this reason, the mask 228 is disposed between the liquid crystal display element 224 and the PBS 223 in the embodiment so as to prevent light having entered the outer area (non-display area) the on the display area 240 at the liquid crystal display element 224 and then reflected at the liquid crystal display element 224, from becoming scattered within the PBS 223.

The surface of the mask 228, which is formed by using a metal sheet or a resin material, is treated (e.g., a black matte finish process) so as to prevent light from being reflected at the surface. The presence of the mask 228 prevents projection of the non-display area at the liquid crystal display element 224. In addition, guides 228a, used when placing the mask 228 at the PBS 223, are formed over the areas of the mask where the mask 228 masks the sides of the display area 240 along the shorter borders 240b, i.e., the top and bottom areas in FIG. 13(a) and the left and right areas in FIG. 13(b) and thus, the opening 228b of the mask 228 can be positioned with a high level of precision at a specific position on the illuminating light output surface of the PBS 223.

It is to be noted that the left and right sides of the mask 228 in FIG. 13(a) are positioned by the case wall surfaces of the case 226 housing the PBS 223. However, it will be obvious that guides 228a may be formed on the left and right sides of the mask 228 (on the sides of the display area along the longer borders 240a thereof) as well, as indicated by the two-point chain line in FIG. 13(a), so as to position the mask 228 bath along the top/bottom direction and along the left/right direction via the guides 228a. It is to be noted that the mask 228 may be bonded onto the PBS 223 with glue. As an alternative, the mask 228 may be attached onto the case 226 and the PBS 223 may be slid between the guides 228a at the mask 228.

FIG. 14 presents another example of the mask 228 with (a) showing the mask in a perspective view and (b) showing the mask in a sectional view taken along B2-B2. The mask 228 is constituted with a pair of mask members each disposed on a side of the display area 240 where a longer borders 240a thereof is located. If the PBS 223 is miniaturized to the very limit in order to provide the projector unit 222 as a compact unit, the width of the mask 228 in FIG. 13(a) measured at the top and bottom of the mask 228 becomes extremely small until it is equal to Ax in FIG. 12. This area thus becomes readily deformed during the assembly process and if the area becomes deformed, the assembly process is bound to become more laborious.

Accordingly, only the wide areas corresponding to the longer borders 240a of the display area 240 alone are masked in the example presented in FIG. 14. Each mask member 228 includes a guide 228a used to position the mask 228 at the PBS 223 at a predetermined position.

Linearly polarized light should be modulated at the liquid crystal display element 224 so that the linearly polarized light having entered the liquid crystal display element 224 exits the liquid crystal display element as linearly polarized light rotated by 90° relative to the incident light. However, due to the pre-tilt angle, which does not allow liquid crystal molecules to assume a completely level state, the linearly polarized will often not rotated by exactly 90° and the polarized light will be output as elliptically polarized light instead, which tends to lower the contrast. Accordingly, a quarter wavelength plate 251, which is to function as a phase difference plates, is disposed between the liquid crystal display element 224 and the PBS 223 so as to adjust the elliptically polarized light emitted from the liquid crystal display element 224 to linearly polarized light and thus improve the contrast.

It is to be noted that reference numerals 250a and 250b each indicate a linear polarizer. The linear polarizer 250a extracts P polarized light (linearly polarized light) to be transmitted through the polarization splitter film 223a from the light emitted from the light source 221. The linear polarizer 250b, on the other hand, has a function of removing P polarized light from the light output from the PBS 223.

Provided that the linear polarizers 250a and 250b and the quarter wavelength plate are each constituted with a sheet member, they are likely to be adhered to the surfaces of the PBS 223. Accordingly, the quarter wavelength plate 251 is disposed at the opening of the mask 228, as shown in FIG. 15(b). The quarter wavelength plate 251, which includes an adhesive layer 251b formed over each surface of an optical film 251a to function as the quarter wavelength plate, is attached to the PBS 223 via an adhesive layer 251b and then the liquid crystal display element 224 is securely adhered via the other adhesive layer onto the quarter wavelength plate 251 having been fixed onto the PBS 223.

A layer of air is present between the liquid crystal display element 224 and the PBS 223 in the configuration shown in FIG. 13. Thus, since there is a significant difference in the refractive index, rays of light are reflected at the individual surfaces to result in loss of light. In contrast, the formation of such an air layer can be prevented by setting the thickness of the quarter wavelength plate 251 to a value greater than the thickness of the mask 228 and the extent of loss of light attributable to the reflection described above can be reduced by ensuring that the refractive index of the material constituting the adhesive layers 251b is close to the refractive indices of the glass substrate 230 (see FIG. 3) at the liquid crystal display element 224 and the optical members constituting the PBS 223 in the structure shown in FIG. 15(b).

In addition, the quarter wavelength plate 251 assumes a shape identical to that of the display area 240 at the liquid crystal display element 224 or a rectangular shape, the areal size of which is greater than that of the display area 240 and slightly smaller than the opening area of the mask 228. Consequently, since the mask 228 does not range over the quarter wavelength plate 251 or the quarter wavelength plate 251 does not range over the mask 228, the projection image is not adversely affected.

Figure 16:
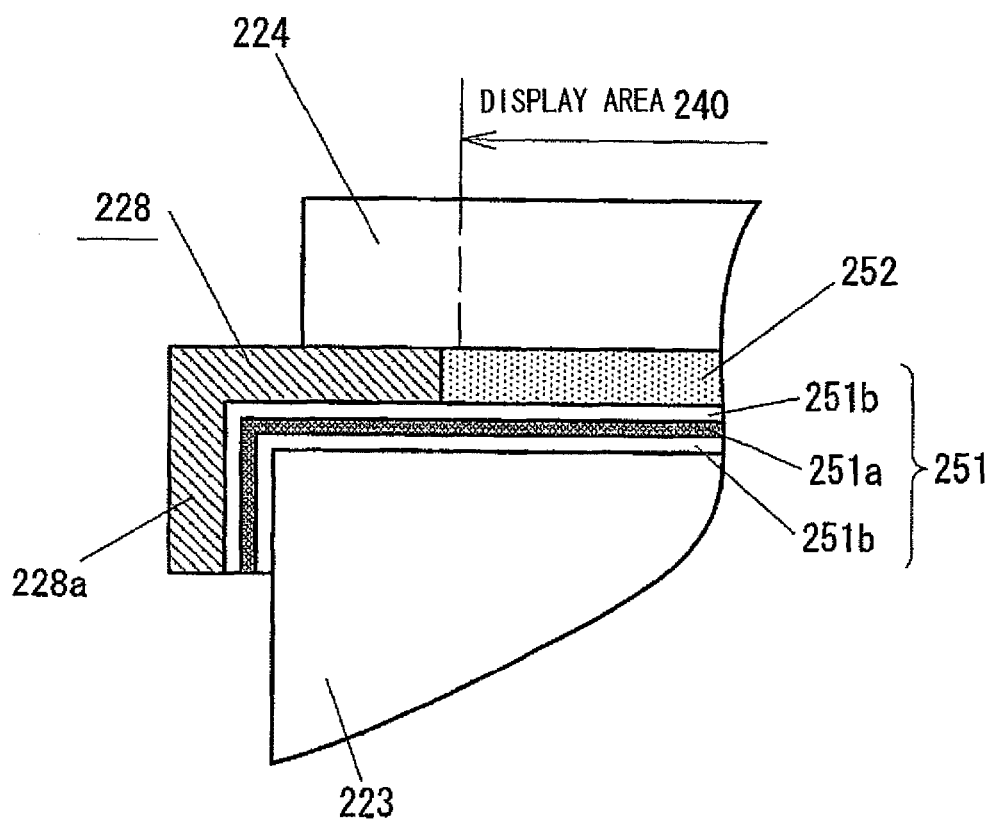
FIG. 16 Another example of a positional arrangement that may be assumed for the ¼ wavelength plate 251.

FIG. 16 presents another example of a positional arrangement that may be adopted in conjunction with the quarter wavelength plate 251. In the example presented in FIG. 16, the quarter wavelength plate 251 assumes a size large enough to allow it to be present between the mask 228 and the PBS 223 as well as over the mask opening. In this case, the mask 228 can be fixed onto the PBS 223 via an adhesive layer 251b at the quarter wavelength plate 251. Since a gap is bound to be formed between the quarter wavelength plate 251 and the liquid crystal display element 224, a transparent material (e.g., glue) achieving a refractive index close to that of the adhesive layers 251b is charged into the gap.

By filling the gap between the quarter wavelength plate 251 and the liquid crystal display element 224 with a transparent material such as a glue, as described above, the occurrence of light loss can be prevented effectively. In addition, since the mask 228 is bonded via the quarter wavelength plate 251, the mask can be more easily disposed at the PBS 223.

((Smaller FPC Installation Space))

As shown in FIG. 3, the flexible printed circuit board (FPC) 232 of the liquid crystal display element 224 is disposed on a longer side of the liquid crystal display element 224 in the embodiment. Provided that the PBS 223 assumes a cubic shape, a greater space allowing for a larger installation margin can be created at the longer sides of the liquid crystal display element 224 compared to the shorter sides of the liquid crystal display element, as explained earlier. By disposing the FPC 232 at a longer side of the liquid crystal display element 224 as shown in FIG. 3, the connector unit 234 for the FPC 232 can be placed in this space margin so as to reduce the extent by which the connector unit 234 projects out beyond the surface of the PBS 223 located on the right side in the figure (see FIG. 7).

Furthermore, as shown in FIG. 17, the liquid crystal display element 224 may be disposed on the PBS 223 with an offset toward the projection side by taking advantage of the space margin on the side opposite from the connector unit 234 so as to ensure that the connector unit 234 does not project out beyond the PBS surface. In the example presented in FIG. 17, the width dimension x3 representing the sum of the widths of the liquid crystal display element 224 and the connector unit 234 is smaller than the length x0 of each side of the PBS 223 and accordingly, by setting a longer border 240a of the display area 240 close to the boundary of the total reflection light output area, it is ensured that the connector unit 234 does not project out to the right beyond the surface of the PBS 223 located on the right side in the figure.

By disposing the connector unit 234 at a longer side of the liquid crystal display element 224 and disposing the liquid crystal display element 224 with an offset toward the projection side as described above, it becomes possible to bend the FPC 232 with a sharper angle around the corner of the PBS 223, which, in turn, further reduces the space required for the installation of the FPC 232. It is to be noted that in conjunction with a projector unit adopting a structure in which S polarized light is input as the illuminating light to the liquid crystal display element 224 as shown in FIG. 5(b), the liquid crystal display element 224 should be disposed with an offset toward the light source side. In such a case, the connector unit of the FPC 232 will assume a position at the upper right corner of the PBS 223 and the FPC 232 will be bent to follow the contour of the upper surface of the PBS 223.

In addition, by beveling the corners of the PBS 223 as indicated by the letter E in FIG. 17(b), the FPC 232 can be bent with a larger radius of curvature. As a result, the FPC 232 can be bent with greater ease and the projector unit can be provided as an even more compact unit. It is to be noted that the area indicated by the letter E can be beveled so as to allow the FPC 232 to be bent with greater ease without adversely affecting the projection image significantly, since the liquid crystal display element 224 is disposed with an offset toward the opposite side (toward the projection side).

If the connector unit 234 is set at a shorter side of the liquid crystal display element 224, the width dimension x3 representing the sum of the width of the liquid crystal display element 224 and the width of the connector unit 234 is most likely to be greater than the dimension x0 of each side of the PBS 223 and, in such a case, the FPC 232 will require a large installation space and miniaturization cannot be achieved readily.

((Improvement in Illuminating Light Utilization Efficiency))

Figure 18:
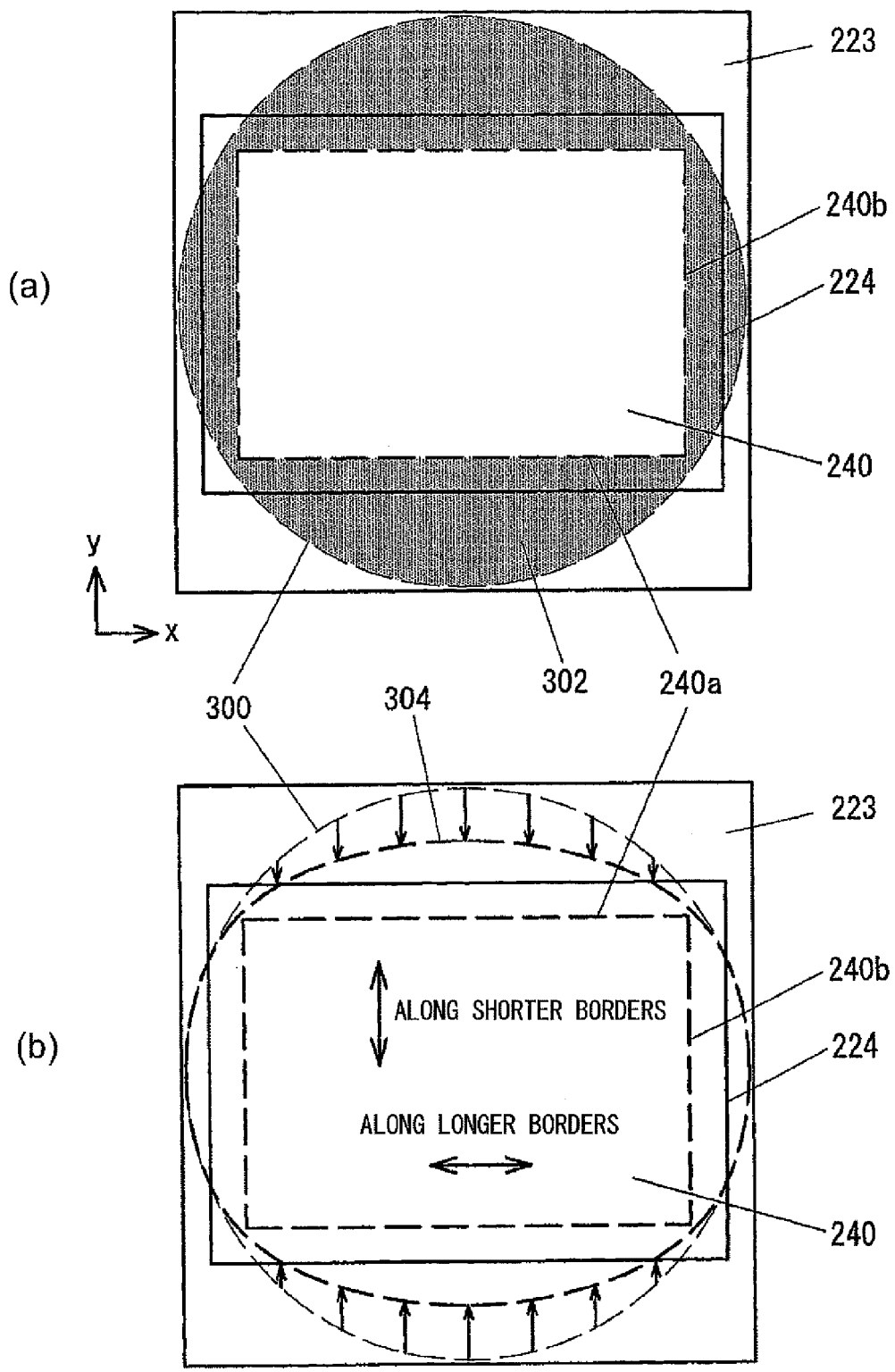
FIG. 18 Illustrations of illuminating ranges covered by the illuminating light for the display area 240, with (a) showing a circular illuminating range and (b) showing an elliptical illuminating range.

In the embodiment described above, the illumination area 300 over which the illuminating light is radiated on the liquid crystal display element 224 assumes a circular shape, as shown in FIG. 18(*a*), since the light originating from the light source is emitted isotropically along the x direction and the y direction and the refractive power of the condenser lens 222 is isotropically applied along the x direction and the y direction. However, since the display area 240 is rectangular with the longer side running in the x direction, the illuminating light irradiating the hatched area 302 is not utilized and is, therefore, wasted.

Figure 19:
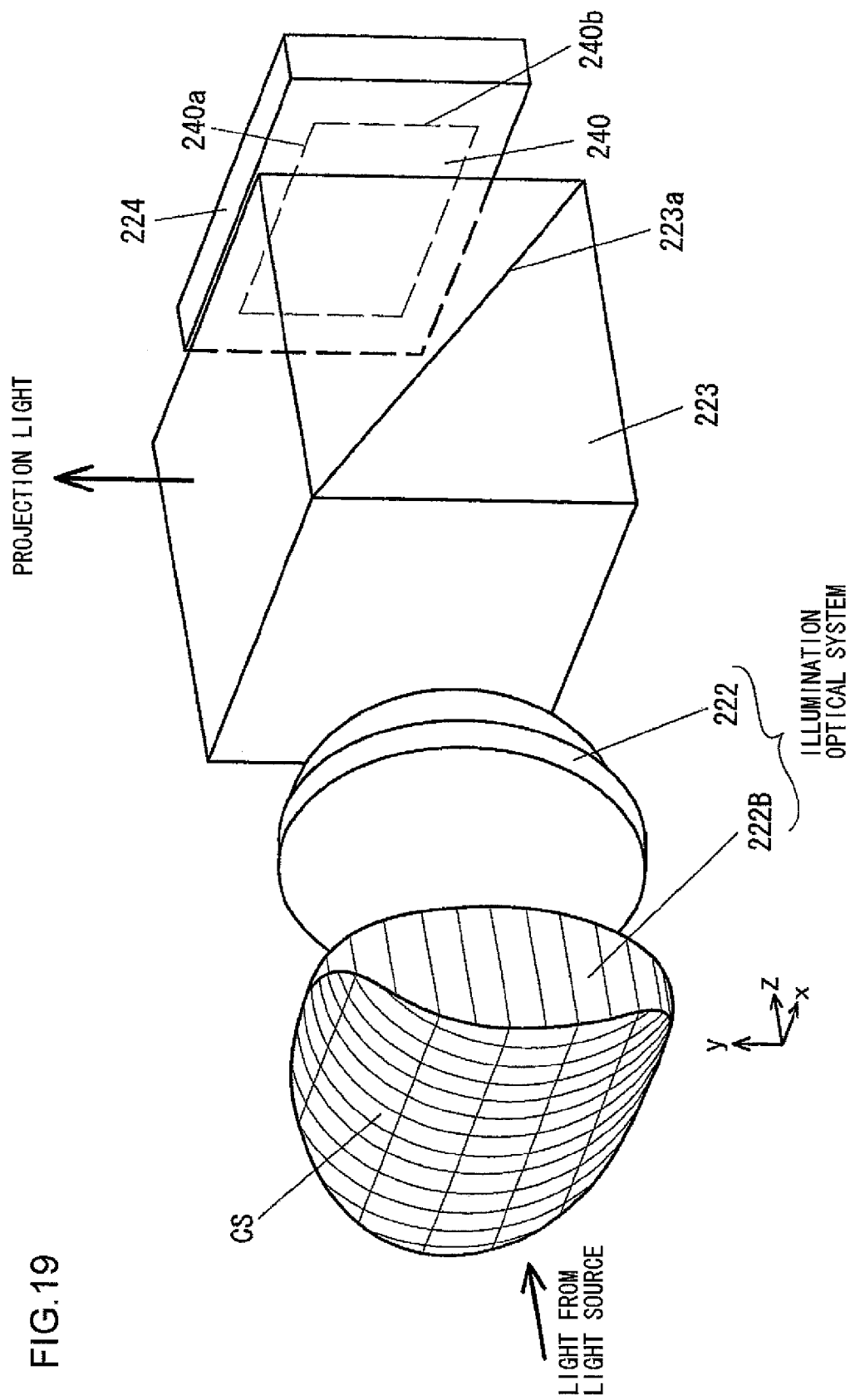
FIG. 19 An illumination optical system equipped with a cylindrical lens 222B.

Accordingly, an illumination optical system such as that shown in FIG. 19 is used so as to re-shape the illumination area 300 in FIG. 18(*a*) to a laterally elongated shape shown in FIG. 18(*b*). The illumination optical system in FIG. 19 includes a cylindrical lens 222B in addition to the condenser lens 222 described earlier. The cylindrical lens 222B with a cylindrical surface CS formed thereat imparts refractive power along the y direction, i.e., along the direction in which the shorter borders 240*b* of the display area 240 extend. As a result, the illumination optical system constituted with the condenser lens 222 and the cylindrical lens 222B manifests a high level of refractive power along the direction in which the shorter sides of the display area 240 extend (y direction) and a low level of refractive power along the direction in which the longer sides of the display area extend (x direction).

Consequently, the range of the illumination area 304 along the shorter sides is reduced and the area over which the illuminating light is radiated beyond the display area 240 is reduced, thereby improving the efficiency with which the illuminating light is utilized. It is to be noted that the use of such an illumination optical system that imparts great refractive power along the shorter sides is bound to result in the illuminating light deviating from the ideal parallel state by a greater extent along the shorter sides than along the longer sides and that such a deviation is likely to cause an increase in the extent of shading. However, since the illumination range along the shorter sides will be narrowed around the optical axis as illustrated in FIG. 18(*b*), i.e., since the illumination area 304 is altered to a lesser extent further away from the optical axis, the shading phenomenon attributable to the deviation from the ideal parallel state does not become prominent.

Figure 20:
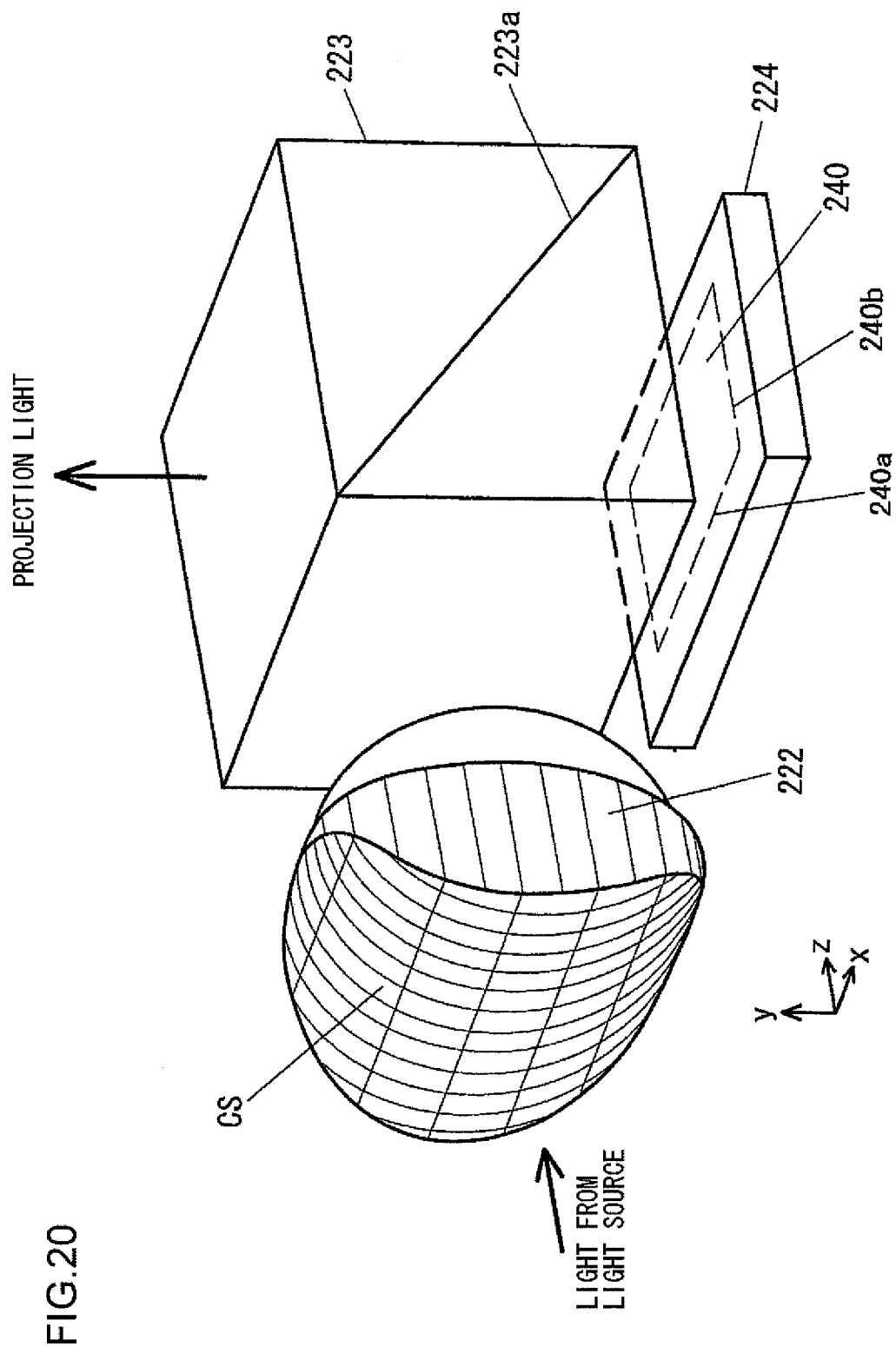
FIG. 20 A positional arrangement that may be assumed for the liquid crystal display element 224 when S polarized light is used in conjunction with an illumination optical system that includes a single lens 222 with a cylindrical surface CS.

While FIG. 19 presents an example of a structure that may be adopted in conjunction with P polarized light used as the illuminating light, a structure such as that shown in FIG. 20 may be adopted in conjunction with S polarized light. It is to be noted that while the illumination optical system in the example presented in FIG. 19 is constituted with a plurality of lenses, i.e., lenses 222 and 222B so as to impart a greater level of refractive power along the y direction compared to the refractive power imparted along the x direction, one surface (entry surface) of the condenser lens 222 is formed as a cylindrical surface CS in the example presented in FIG. 20. By adopting such a single lens structure, further miniaturization of the projector unit can be achieved. In addition, instead of a cylindrical surface, a non-spherical surface that allows a greater level of refractive power to be imparted along the y direction.

Figure 21:
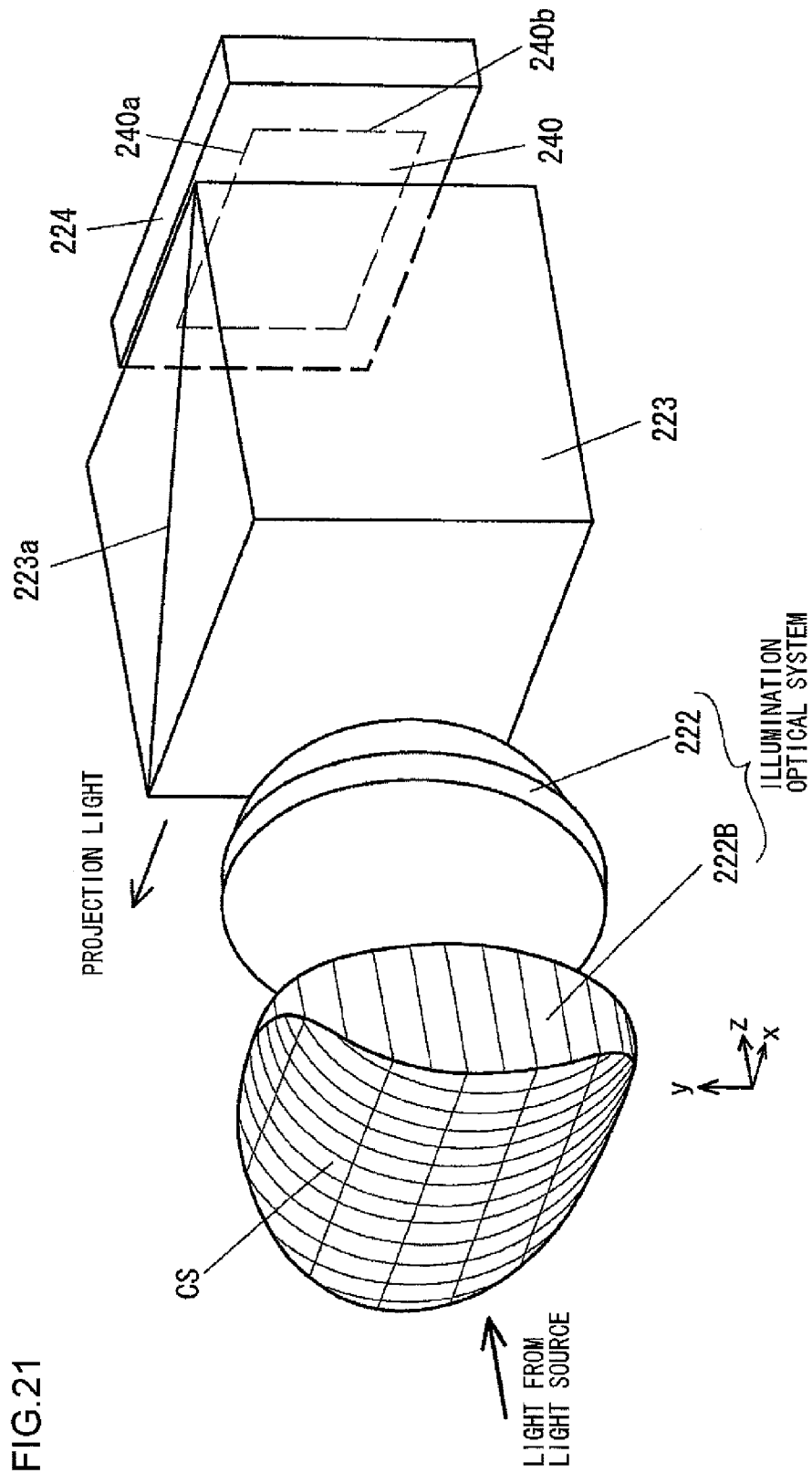
FIG. 21 A structure that may be adopted when the direction along which the polarization splitter film 223a ranges is aligned with the direction along which the shorter borders of the display area 240 extend (y direction)

It is to be noted that in the examples described above, the direction along which the longer sides of the display area 240 extend and the direction along which the polarization splitter film 223*a* at the PBS 223 ranges (the x direction in FIG. 19) are aligned so as to minimize the extent of shading. However, the direction of along the polarization splitter film 223*a* ranges may be aligned with the direction along which the shorter sides of the display area 240 extend (the y direction) as shown in FIG. 21 so as to simply maximize the efficiency with which the illuminating light is utilized.

(Variations)

Figure 22:
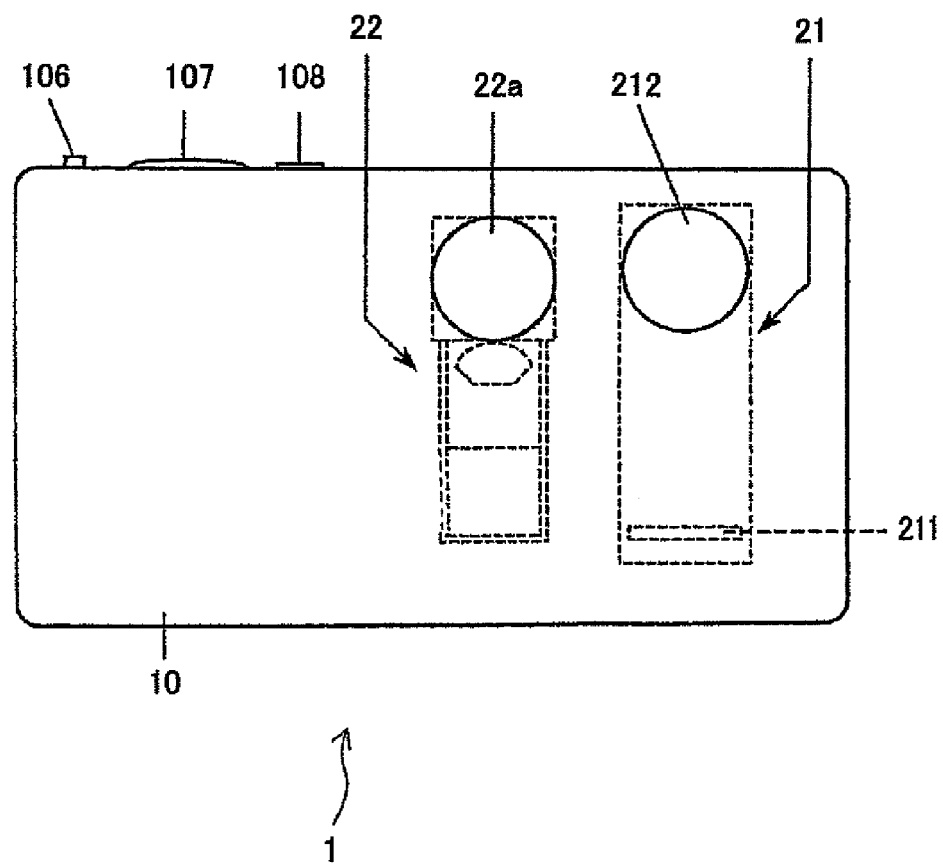
FIG. 22 A front view of a digital camera 1 achieved as a variation.
Figure 23:
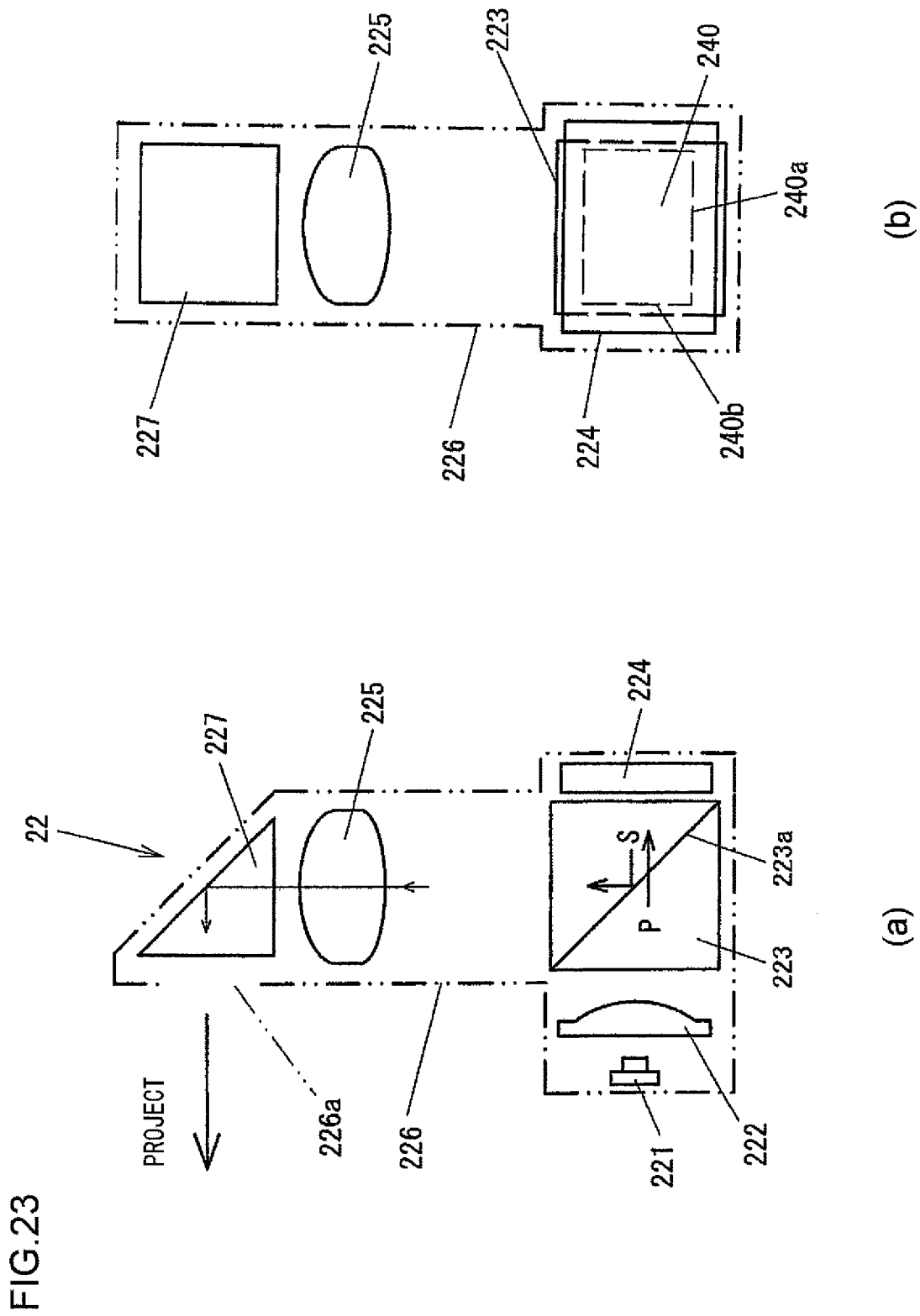
FIG. 23 A structure that may be adopted in a projector unit 22 that uses P polarized light as the illuminating light, with (a) showing the projector unit viewed from a side of the camera in a side elevation and (b) showing the projector unit viewed from the rear of the camera.
Figure 24:
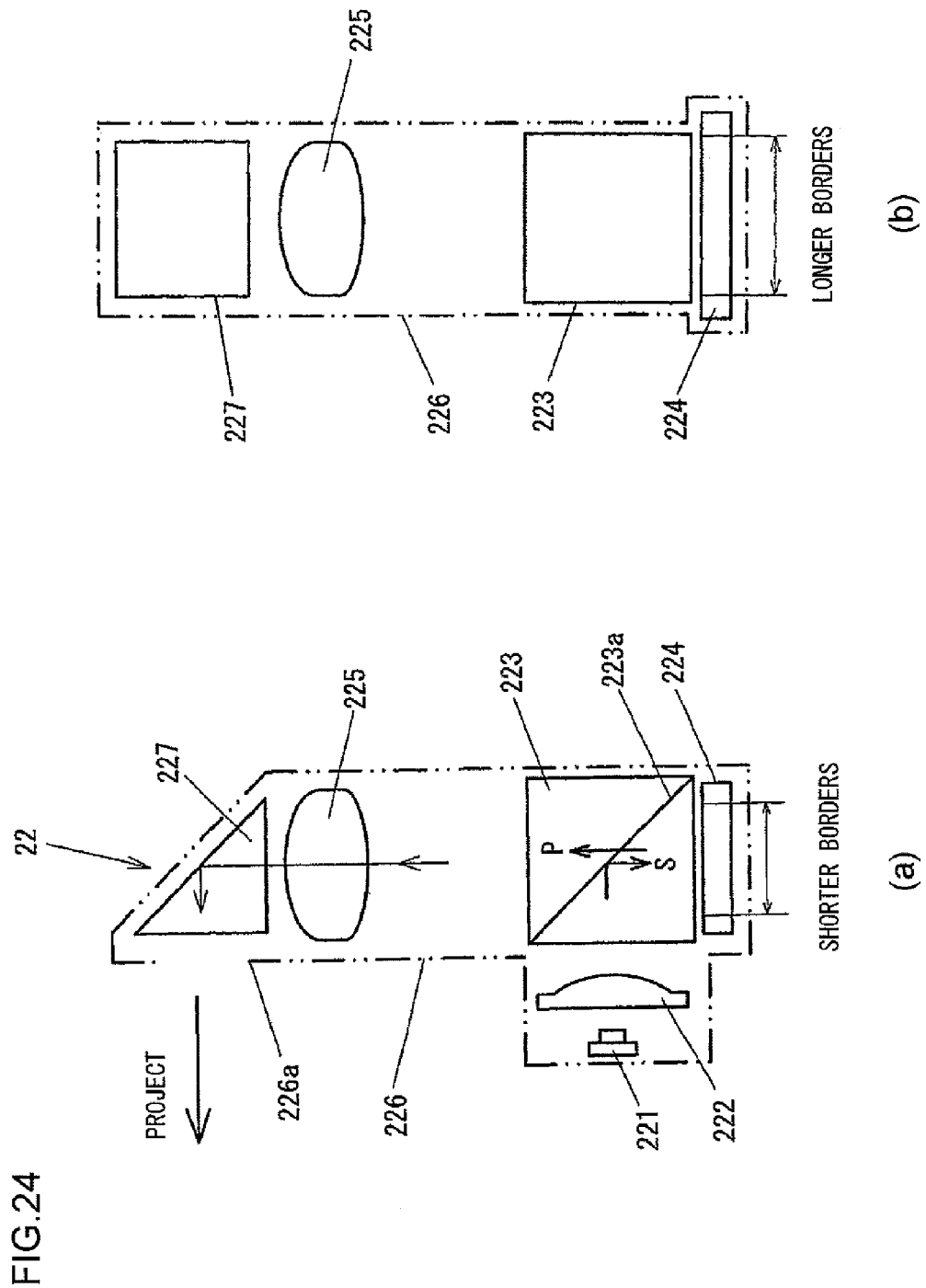
FIG. 24 A structure that may be adopted in a projector unit 22 that uses S polarized light as the illuminating light, with (a) showing the projector unit viewed from a side of the camera in a side elevation and (b) showing the projector unit viewed from the rear of the camera.

FIGS. 22~24 present examples of variations of the embodiment. FIG. 22 presents an external view of a camera. The camera 1 in FIG. 22 includes a photographing unit 21 and a projector unit 22 disposed within a camera main body 10. The photographing unit 21 includes an image sensor 211 and captures a subject image via a photographing window 212 located at the front surface of the camera. The projector unit 22 also includes a window, i.e., a projection window 22*a*, located at the front surface of the camera, and projects a projection image out in front of the camera.

FIG. 23 shows the structure of the projection unit 22, which is engaged in operation by using P polarized light as the illuminating light. In FIG. 23, (a) is a side elevation of the projector unit viewed from a side of the camera and (b) shows the projector unit viewed from the rear of the camera. The projector unit in the figure differs from the projector unit 22 in FIG. 2 in that it includes a triangular prism 227 disposed at a stage to the rear of the projection lens 225. It is also noteworthy that the light source 221, the condenser lens 222 and the PBS 223 are arrayed in this order starting from the camera front surface side toward the camera rear surface side. The projection light departing the projection lens 225 is reflected at the triangular prism 227 toward a point in front of the camera and is projected toward the point in front of the camera through the opening 226*a* of the case 226. In addition, the liquid crystal display element 224 is oriented so that the longer borders 240*a* of the display area 240 extend horizontally to ensure that the longer sides of the projection image are projected horizontally (along the left/right direction in the figure).

FIG. 24 illustrates a positional arrangement that may be adopted for the liquid crystal display device 224 when S polarized light is used as the illuminating light. As in FIGS. 23(*a*) and (*b*) in FIG. 24 respectively present a side elevation of the projector unit 22 and a view taken from the rear of the camera. In this configuration, the liquid crystal display element 224 is disposed at a position facing opposite the side surface of the PBS 223 through which the S polarized light to be used as the illuminating light is output.

It is to be noted that while the projector apparatus is mounted at a digital camera in the embodiment described above, the present invention is not limited to this example and it may be adopted in a compact projector apparatus mounted at a portable instrument such as a portable telephone instead of a digital camera. In addition, while the invention has been particularly shown and described with respect to preferred embodiment, the present invention is not limited to this example and it will be understood by those skilled in the art that various changes in form and detail may be made therein without departing from the spirit, scope and teaching of the invention, as long as the features characterizing the present invention remain intact. It is to be further noted that the embodiment may be adopted in combination with any one of, or a plurality of the variations.

The disclosures of the following priority applications are herein incorporated by reference:

Japanese Patent Application No. 2007-271218 filed Oct. 18, 2007

Japanese Patent Application No. 2007-273867 filed Oct. 22, 2007

The invention claimed is:

1. A projector apparatus, comprising:
a polarization beam splitter block assuming a shape of a rectangular parallelepiped that includes two end surfaces arranged orthogonally relative to a polarization beam splitting surface and four side surfaces perpendicular to the end surfaces;
a light source disposed so as to face opposite one of the side surfaces of the polarization beam splitter block, which emits illuminating light including first divergent light;
an illumination optical system that is disposed between the light source and the polarization beam splitter block, and directs a light flux among illuminating light emitted from the light source to the polarization beam splitter block, the light flux including second divergent light with smaller divergent angle than the first divergent light;
a reflection-type liquid crystal display element that is disposed so as to face opposite an illuminating light output surface of the polarization beam splitter block, through which an illuminating light having undergone polarization separation at the polarization beam splitting surface is output, and includes a rectangular display area through which the illuminating light having undergone the polarization separation is modulated to modulated light and the modulated light is output to the polarization beam splitter block, the rectangular display area including shorter borders and longer borders; and
a projection optical system that forms a projection image with light obtained by subjecting the modulated light to polarization separation at the polarization beam splitting surface, wherein:
the illumination optical system is configured to have a greater refractive power along the shorter borders of the rectangular display area than the longer borders of the rectangular display area; and
the reflection-type liquid crystal display element is disposed so as to set the shorter borders of the rectangular display area parallel to the end surfaces.

2. A projector apparatus according to claim 1, wherein:
the shorter borders of the rectangular display area are set parallel to the end surfaces so as to reduce an extent to which polarization beam splitting characteristics at the polarization beam splitting surface are adversely affected by deviation of the light departing the illumination optical system from an ideal parallel state.

3. A projector apparatus according to claim 1 wherein:
a surface light source is used as the light source.

4. A projector apparatus according to claim 1, wherein:
the reflection-type liquid crystal display element is disposed so that a light beam among the second divergent light entering the polarization beam splitter block does not enter the rectangular display area, the light beam entering a surface at which the reflection-type liquid crystal display element of the polarization beam splitter block is displaced after having been totally reflected at the side surfaces or the end surfaces.

5. A projector apparatus according to claim 1, wherein:
the projector apparatus projects a rectangular projection image which is laterally elongated along a horizontal direction frontward relative to the apparatus; and
the light source, the illumination optical system, the polarization beam splitter block and the reflection-type liquid crystal display element are disposed in a single row along a vertical direction and the reflection-type liquid crystal display element is disposed so that longer borders of the rectangular display area extend parallel to longer sides of the rectangular projection image.

6. A projector apparatus according to claim 1, wherein:
the projector apparatus projects a rectangular projection image which is laterally elongated along a horizontal direction frontward relative to the apparatus; and
the light source, the illumination optical system and the polarization beam splitter block are disposed in a single row along a vertical direction, and the reflection-type liquid crystal display element and the polarization beam splitter block are disposed in a single row along a projecting direction so that longer borders of the rectangular display area extend parallel to longer sides of the rectangular projection image.

7. A projector apparatus according to claim 1, wherein:
the shorter borders of the rectangular display area are set parallel to the end surface so that the illuminating light with opening angles enters into the rectangular display area, the opening angles formed with the light polarization beam splitting surface and the illuminating light being greater than 35 degrees.

8. A projector apparatus, comprising:
a polarization beam splitter block assuming a shape of a rectangular parallelepiped that includes two end surfaces arranged orthogonally relative to a polarization beam splitting surface and four side surfaces perpendicular to the end surfaces;
a light source disposed so as to face opposite one of the side surfaces of the polarization beam splitter block, which emits illuminating light including first divergent light;
an illumination optical system that is disposed between the light source and the polarization beam splitter block, and directs a light flux among the illuminating light emitted from the light source to the polarization beam splitter block, the light flux including second divergent light with smaller divergent angle than the first divergent light;
a reflection-type liquid crystal display element that is disposed so as to face opposite an illuminating light output surface of the polarization beam splitter block, through which an illuminating light having undergone polarization separation at the polarization beam splitting surface is output, and includes a rectangular display area through which the illuminating light having undergone the polarization separation is modulated to modulated light and the modulated light is output to the polarization beam splitter block; and
a projection optical system that forms a projection image with light obtained by subjecting the modulated light to polarization separation at the polarization beam splitting surface, wherein:
the reflection-type liquid crystal display element is disposed so that a light beam among the second divergent light entering the polarization beam splitter block does not enter the rectangular display area, the light beam entering a surface at which the reflection-type liquid crystal display element of the polarization beam splitter block is displaced after having been totally reflected at the side surfaces or the end surfaces.

9. A projector apparatus, comprising:
a polarization beam splitter block assuming a shape of a rectangular parallelepiped that includes two end surfaces arranged orthogonally relative to a polarization beam splitting surface and four side surfaces perpendicular to the end surfaces;
a light source disposed so as to face opposite one of the side surfaces of the polarization beam splitter block, which emits illuminating light including first divergent light;
an illumination optical system that is disposed between the light source and the polarization beam splitter block, and directs a light flux among illuminating light emitted from the light source to the polarization beam splitter block, the light flux including second divergent light with smaller divergent angle than the first divergent light;
a reflection-type liquid crystal display element that is disposed so as to face opposite an illuminating light output surface of the polarization beam splitter block, through which an illuminating light having undergone polarization separation at the polarization beam splitting surface is output, and includes a rectangular display area through which the illuminating light having undergone the polarization separation is modulated to modulated light and the modulated light is output to the polarization beam splitter block, the rectangular display area including shorter borders and longer borders; and
a projection optical system that forms a projection image with light obtained by subjecting the modulated light to polarization separation at the polarization beam splitting surface; and
a mask that is disposed between the reflection-type liquid crystal display element and the polarization beam splitter block so as to prevent a light beam from entering the rectangular display area, the light beam among the light flux entered in the polarization beam splitter block entering the illuminating light output surface of which the reflection-type liquid crystal display element faces after being reflected on the end surfaces or the side surfaces, wherein:
the illumination optical system imparts greater refractive power along shorter borders of the rectangular display area than along longer borders of the rectangular display area.

10. A projector apparatus according to claim 9, wherein:
the reflection-type liquid crystal display element is disposed so that the shorter borders of the rectangular display area extend parallel to the end surfaces in order to reduce an extent to which polarization beam splitting characteristics at the polarization beam splitting surface are adversely affected by deviation of the light departing the illumination optical system from an ideal parallel state.

11. A projector apparatus according to claim 9, wherein:
the reflection-type liquid crystal display element is disposed so that the rectangular display area faces opposite an area further inside relative to a total reflection light output area set at a periphery of the illuminating light output surface.

12. A projector apparatus according to claim 9, wherein:
the illumination optical system is configured to a single lens having one surface thereof formed as a cylindrical surface.

13. A projector apparatus according to claim 9, wherein:
the illumination optical system is configured to a single lens that includes a non-spherical surface.

* * * * *